(12) United States Patent
Wang et al.

(10) Patent No.: US 11,374,708 B2
(45) Date of Patent: Jun. 28, 2022

(54) COMMUNICATION METHOD AND COMMUNICATIONS APPARATUS

(71) Applicant: HUAWEI TECHNOLOGIES CO., LTD., Guangdong (CN)

(72) Inventors: Lei Wang, Shanghai (CN); Yan Chen, Shanghai (CN); Xiuqiang Xu, Shanghai (CN); Lei Zhang, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 240 days.

(21) Appl. No.: 15/931,066

(22) Filed: May 13, 2020

(65) Prior Publication Data

US 2020/0274665 A1 Aug. 27, 2020

Related U.S. Application Data

(63) Continuation of application No. PCT/CN2018/114907, filed on Nov. 9, 2018.

(30) Foreign Application Priority Data

Nov. 14, 2017 (CN) .......................... 201711125023.5

(51) Int. Cl.
*H04L 1/08* (2006.01)
*H04L 5/00* (2006.01)
*H04W 72/04* (2009.01)

(52) U.S. Cl.
CPC .............. *H04L 5/0048* (2013.01); *H04L 1/08* (2013.01); *H04L 5/0005* (2013.01); *H04L 5/0053* (2013.01); *H04W 72/0446* (2013.01)

(58) Field of Classification Search
CPC ........ H04L 1/08; H04L 5/0048; H04L 5/0051
See application file for complete search history.

(56) References Cited

U.S. PATENT DOCUMENTS

2010/0062770 A1* 3/2010 Flynn .................... H04W 12/12
455/466
2017/0288817 A1 10/2017 Cao et al.
(Continued)

FOREIGN PATENT DOCUMENTS

CN 101667899 A 3/2010
CN 103944665 A 7/2014
(Continued)

OTHER PUBLICATIONS

Intel Corporation, "UL grant-free transmissions: Resource configuration", 3GPP TSG RAN WG1 NR Ad-Hoc#2 R1-1710568, (Jun. 30, 2017), total 5 pages.
(Continued)

*Primary Examiner* — Diane L Lo
*Assistant Examiner* — Abusayeed M Haque
(74) *Attorney, Agent, or Firm* — Womble Bond Dickinson (US) LLP

(57) ABSTRACT

This application discloses a communication method and a communications apparatus. The method implemented by a terminal includes: determining a configuration mode of one or more pilots used for K repeated transmissions, where in a first configuration mode, the terminal device sends a same pilot in each of first N of the K repeated transmissions, and does not send a pilot in remaining K−N transmissions; in a second configuration mode, the terminal device sends a first pilot in first N of the K repeated transmissions, and sends a second pilot in the remaining K−N transmissions; and in the third configuration mode, the terminal device sends the first pilot in each transmission in a first round of K transmissions, and sends the second pilot in each transmission in a second round of K transmissions; and sending the pilots based on the determined configuration mode when performing the K repeated transmissions.

14 Claims, 6 Drawing Sheets

(56) References Cited

U.S. PATENT DOCUMENTS

2018/0109273 A1* 4/2018 Talty .................... H04B 1/0042
2018/0248672 A1* 8/2018 Bhattad .................... H04L 1/08

FOREIGN PATENT DOCUMENTS

| CN | 106507497 A | 3/2017 | |
|----|----|----|----|
| CN | 106792727 A | 5/2017 | |
| CN | 107241809 A | 10/2017 | |
| WO | WO 2012062456 * | 5/2013 | ............... H04B 7/26 |
| WO | WO 2015005745 * | 1/2015 | ............ H04W 72/04 |
| WO | WO 2017132806 * | 8/2017 | ............ H04L 5/02 |
| WO | WO 2017133306 * | 8/2017 | ............ H04L 5/00 |
| WO | 2017167198 A1 | 10/2017 | |
| WO | WO 2019020159 * | 1/2019 | ............ H04W 48/12 |

OTHER PUBLICATIONS

Samsung, "Collision analysis of grant-free based multiple access", 3GPP TSG RAN WG1 Meeting #86bis R1-1609038, (Oct. 14, 2016),total 3 pages.

Fujitsu, "DM-RS considerations for UL non-orthogonal multiple access", 3GPP TSG RAN WG1 Meeting #86bis R1-1608802, (Oct. 14, 2016),total 4 pages.

LG Electronics, "Summary of [89-22] Email discussion about UL data transmission without UL grant", 3GPP TSG RAN WG1 Ad-Hoc#2 R1-1710328, (Jun. 30, 2017),total 41 pages.

Huawei, HiSilicon, DMRS design for URLLC. 3GPP TSG RAN WG1 Meeting #90bis, Prague, Czech Republic, Oct. 9-13, 2017, R1-1718250, 5 pages.

Huawei, HiSilicon, UL data transmission with and without SR/UL grant. 3GPP TSG WG1 NR Ad Hoc Meeting, Nagoya, Japan, 18 Sep. 21, 2017, R1-1715419, 11 pages.

* cited by examiner

COMMUNICATION METHOD AND COMMUNICATIONS APPARATUS

CROSS-REFERENCE TO RELATED APPLICATIONS

This application is a continuation of International Application No. PCT/CN2018/114907, filed on Nov. 9, 2018, which claims priority to Chinese Patent Application No. 201711125023.5, filed on Nov. 14, 2017. The disclosures of the aforementioned applications are hereby incorporated by reference in their entireties.

TECHNICAL FIELD

This application relates to the field of communications technologies, and in particular, to a communication method and a communications apparatus.

BACKGROUND

In an existing third generation (3G) mobile communications system/fourth generation (4G) mobile communications system, a grant mode is usually used for uplink transmission. To be specific, a network device determines a physical layer parameter, and delivers the physical layer parameter to a terminal device by using control signaling. However, in a fifth generation (5G) mobile communications system, a grant-free transmission mode is used for an uplink small packet service. Before sending data, a terminal device does not need to request a scheduling resource from a network device, but directly sends service data on a specific time-frequency resource. In this mode, signaling overheads may be greatly reduced and an access delay may be shortened.

In the grant-free mode, to improve reliability, the terminal device repeatedly sends a same data packet for K times (where the K repeated transmissions are referred to as one round of sending). To improve receiving reliability, the network device performs combined decoding on several of the K transmissions. Therefore, the network device not only needs to determine, by detecting one or more pilots, whether the terminal device transmits the data in a current subframe, but also needs to determine, based on the pilots, whether the current subframe is a subframe of the first transmission of the K transmissions. After this round of K transmissions is completed, if there is still a data sending requirement, a next round of K transmissions is performed.

In the grant-free mode, by detecting one or more pilots sent by the terminal device, the network device identifies the terminal device or determines the initial transmission subframe. A quantity of pilots that can be carried on a time-frequency resource in the grant-free mode is limited, and each terminal device needs to occupy two different pilots. Consequently, the quantity of pilots is insufficient. When the quantity of pilots is insufficient, the following problems occur: If the pilots are all allocated by the network device, the network device rejects access of a new terminal device or forcibly releases some existing terminal devices; or if a pilot is randomly selected by the terminal device within a range, a probability of selecting a same pilot by a plurality of terminal devices (where this case is referred to as a pilot collision) is greatly increased.

In conclusion, how to configure pilots in a communications system needs to be urgently resolved, to reduce pilot overheads and improve pilot utilization.

SUMMARY

This application provides a communication method and a communications apparatus, to configure a pilot. This reduces pilot overheads, and improves pilot utilization.

According to a first aspect of this application, a communications method is provided. The method includes: determining, by a terminal device, a configuration mode of one or more pilots used for K repeated transmissions, where the configuration mode includes at least one of the following modes: a first configuration mode, a second configuration mode, or a third configuration mode; and in the first configuration mode, the terminal device sends a same pilot in each of first N of the K repeated transmissions, and does not send a pilot in remaining K−N transmissions; in the second configuration mode, the terminal device sends a first pilot in each of first N of the K repeated transmissions, and sends a second pilot in each of remaining K−N transmissions; in the third configuration mode, the terminal device sends the first pilot in each transmission in a first round of K repeated transmissions, and sends the second pilot in each transmission in a second round of K repeated transmissions, where the first round of K repeated transmissions is adjacent to the second round of K repeated transmissions, a pilot pattern of the second pilot is the same as a pilot pattern of the first pilot, a pilot sequence of the second pilot is obtained after minus one is multiplied by a pilot sequence generated by the first pilot in a subframe in which the first pilot is located, K≥2, and N is a positive integer less than K; and sending, by the terminal device, the pilots based on the determined configuration mode when performing the K repeated transmissions. In this aspect, in the K repeated transmissions, the terminal device needs to configure only one pilot for each terminal device, so that pilot overheads are low and pilot utilization is high.

In one embodiment, the determining, by a terminal device, a configuration mode of one or more pilots used for K repeated transmissions includes: receiving, by the terminal device, configuration information sent by a network device, where the configuration information is used to determine the configuration mode of the pilots used for the K repeated transmissions. In this implementation, the network device configures the configuration mode of the pilots. In this way, when receiving a pilot sent by the terminal device, the network device may receive the pilot on a corresponding time-frequency resource based on the configuration information sent to the terminal device.

In one embodiment, the method further includes: receiving, by the terminal device, a configuration switch indication of the pilots; and switching, by the terminal device, a current configuration mode of the pilots to a previously configured dual-pilot configuration mode according to the configuration switch indication, where in the dual-pilot configuration mode, a third pilot is sent in the first of the K repeated transmissions, and a fourth pilot is sent in one or more other of the K repeated transmissions, where a pilot sequence of the fourth pilot cannot be expressed as a product of a constant and a pilot sequence of the third pilot in a subframe in which the fourth pilot is located, or a pilot pattern of the third pilot is different from a pilot pattern of the fourth pilot. In this implementation, for example, when pilot resources are sufficient, the terminal device may switch a single-pilot configuration mode to the dual-pilot configuration mode. Based on the pilots sent by the terminal device in the dual-pilot configuration mode, the network device may conveniently identify an initial transmission subframe and a retransmission subframe.

Correspondingly, according to a second aspect of this application, a communications apparatus is provided, and can implement the foregoing communication method. For example, the communications apparatus may be a chip (such as a baseband chip or a communications chip) or a device (such as a terminal device). The foregoing method may be implemented by using software, hardware, or hardware executing corresponding software.

In one embodiment, a structure of the communications apparatus includes a processor and a memory. The processor is configured to support the apparatus in performing a corresponding function in the foregoing communication method. The memory is configured to be coupled to the processor, and stores a program (instruction) and/or data that are/is necessary for the apparatus. In one embodiment, the communications apparatus may further include a communications interface, configured to support communication between the apparatus and another network element.

In one embodiment, the communications apparatus may include a processing unit and a sending unit. The processing unit is configured to implement a processing function in the foregoing method, and the sending unit is configured to implement a sending function in the foregoing method. For example, the processing unit is configured to determine a configuration mode of one or more pilots used for K repeated transmissions, where the configuration mode includes at least one of the following modes: a first configuration mode, a second configuration mode, or a third configuration mode; and in the first configuration mode, the communications apparatus sends a same pilot in each of first N of the K repeated transmissions, and does not send a pilot in remaining K−N transmissions; in the second configuration mode, the communications apparatus sends a first pilot in each of first N of the K repeated transmissions, and sends a second pilot in each of remaining K−N transmissions; in the third configuration mode, the communications apparatus sends the first pilot in each transmission in a first round of K repeated transmissions, and sends the second pilot in each transmission in a second round of K repeated transmissions, where the first round of K repeated transmissions is adjacent to the second round of K repeated transmissions, a pilot pattern of the second pilot is the same as a pilot pattern of the first pilot, a pilot sequence of the second pilot is obtained after minus one is multiplied by a pilot sequence generated by the first pilot in a subframe in which the first pilot is located, K≥2, and N is a positive integer less than K; and the sending unit is configured to send the pilots based on the determined configuration mode when the K repeated transmissions are performed.

In one embodiment, the communications apparatus may further include a receiving unit. The receiving unit is configured to implement a receiving function in the foregoing method. Specifically, the receiving unit is configured to receive configuration information sent by a network device, where the configuration information is used to determine the configuration mode of the pilots used for the K repeated transmissions.

In one embodiment, the receiving unit is further configured to receive a configuration switch indication of the pilots; and the processing unit is further configured to switch a current configuration mode of the pilots to a previously configured dual-pilot configuration mode according to the configuration switch indication, where in the dual-pilot configuration mode, a third pilot is sent in the first of the K repeated transmissions, and a fourth pilot is sent in one or more other of the K repeated transmissions, where a pilot sequence of the fourth pilot cannot be expressed as a product of a constant and a pilot sequence of the third pilot in a subframe in which the fourth pilot is located, or a pilot pattern of the third pilot is different from a pilot pattern of the fourth pilot.

When the communications apparatus is a chip, the receiving unit may be an input unit, for example, an input circuit or an input communications interface; and the sending unit may be an output unit, for example, an output circuit or an output communications interface. When the communications apparatus is a device, the receiving unit may be a receiver (which may also be referred to as a receiver); and the sending unit may be a transmitter (which may also be referred to as a transmitter).

According to a third aspect of this application, a communications method is provided. The method includes: sending, by a network device, configuration information to a terminal device, where the configuration information is used to determine a configuration mode of one or more pilots used for K repeated transmissions of the terminal device, the configuration mode includes at least one of the following modes: a first configuration mode, a second configuration mode, or a third configuration mode; and in the first configuration mode, the terminal device sends a same pilot in each of first N of the K repeated transmissions, and does not send a pilot in remaining K−N transmissions; in the second configuration mode, the terminal device sends a first pilot in each of first N of the K repeated transmissions, and sends a second pilot in each of remaining K−N transmissions; in the third configuration mode, the terminal device sends the first pilot in each transmission in a first round of K repeated transmissions, and sends the second pilot in each transmission in a second round of K repeated transmissions, where the first round of K repeated transmissions is adjacent to the second round of K repeated transmissions, a pilot pattern of the second pilot is the same as a pilot pattern of the first pilot, a pilot sequence of the second pilot is obtained after minus one is multiplied by a pilot sequence generated by the first pilot in a subframe in which the first pilot is located, K≥2, and N is a positive integer less than K; and receiving, by the network device, the pilots sent by the terminal device based on the configuration mode determined based on the configuration information. In this aspect, in the K repeated transmissions, the network device configures only one pilot for each terminal device, so that pilot overheads are small and pilot utilization is high.

In one embodiment, the method further includes: determining, by the network device based on an abrupt energy change or phase change of the received pilots, a subframe in which the first of the K repeated transmissions of the terminal device is performed. In this implementation, the network device needs to allocate only one pilot to the terminal device to identify a subframe of the first transmission. This reduces pilot overheads.

In one embodiment, the method further includes: sending, by the network device, a configuration switch indication of the pilots to the terminal device, where the configuration switch indication is used to instruct the terminal device to switch a current configuration mode of the pilots to a previously configured dual-pilot configuration mode, and in the dual-pilot configuration mode, a third pilot is sent in the first of the K repeated transmissions, and a fourth pilot is sent in one or more other of the K repeated transmissions, where a pilot sequence of the fourth pilot cannot be expressed as a product of a constant and a pilot sequence of the third pilot in a subframe in which the fourth pilot is located, or a pilot pattern of the third pilot is different from a pilot pattern of the fourth pilot. In this implementation, for example, when pilot resources are sufficient, the terminal device may switch a single-pilot configuration mode to the dual-pilot configuration mode. This further improves pilot utilization. In addition, based on pilots sent by the terminal device in the dual-pilot configuration mode, the network device may conveniently identify an initial transmission subframe and a retransmission subframe.

Correspondingly, according to a fourth aspect of this application, a communications apparatus is provided, and can implement the foregoing communication method. For example, the communications apparatus may be a chip (such as a baseband chip or a communications chip) or a device (such as a network device or a baseband board). The foregoing method may be implemented by using software, hardware, or hardware executing corresponding software.

In one embodiment, a structure of the communications apparatus includes a processor and a memory. The processor is configured to support the apparatus in performing a corresponding function in the foregoing communication method. The memory is configured to be coupled to the processor, and stores a program (instruction) and data that are necessary for the apparatus. In one embodiment, the communications apparatus may further include a communications interface, configured to support communication between the apparatus and another network element.

In one embodiment, the communications apparatus may include a sending unit and a receiving unit. The receiving unit and the sending unit are respectively configured to implement receiving and sending functions in the foregoing method. For example, the sending unit is configured to send configuration information to a terminal device, where the configuration information is used to determine a configuration mode of one or more pilots used for K repeated transmissions of the terminal device, the configuration mode includes at least one of the following modes: a first configuration mode, a second configuration mode, or a third configuration mode; and in the first configuration mode, the terminal device sends a same pilot in each of first N of the K repeated transmissions, and does not send a pilot in remaining K−N transmissions; in the second configuration mode, the terminal device sends a first pilot in each of first N of the K repeated transmissions, and sends a second pilot in each of remaining K−N transmissions; in the third configuration mode, the terminal device sends the first pilot in each transmission in a first round of K repeated transmissions, and sends the second pilot in each transmission in a second round of K repeated transmissions, where the first round of K repeated transmissions is adjacent to the second round of K repeated transmissions, a pilot pattern of the second pilot is the same as a pilot pattern of the first pilot, a pilot sequence of the second pilot is obtained after minus one is multiplied by a pilot sequence generated by the first pilot in a subframe in which the first pilot is located, K≥2, and N is a positive integer less than K; and the receiving unit is configured to receive the pilots sent by the terminal device based on the configuration mode determined based on the configuration information.

In one embodiment, the communications apparatus may further include a processing unit. The processing unit is configured to implement a processing function in the foregoing method. Specifically, the processing unit is configured to determine, based on an abrupt energy change or phase change of the received pilots, a subframe in which the first of the K repeated transmissions of the terminal device is performed.

In one embodiment, the sending unit is further configured to send a configuration switch indication of the pilots to the terminal device, where the configuration switch indication is used to instruct the terminal device to switch a current configuration mode of the pilots to a previously configured dual-pilot configuration mode, and in the dual-pilot configuration mode, a third pilot is sent in the first of the K repeated transmissions, and a fourth pilot is sent in one or more other of the K repeated transmissions, where a pilot sequence of the fourth pilot cannot be expressed as a product of a constant and a pilot sequence of the third pilot in a subframe in which the fourth pilot is located, or a pilot pattern of the third pilot is different from a pilot pattern of the fourth pilot.

When the communications apparatus is a chip, the receiving unit may be an input unit, for example, an input circuit or a communications interface; and the sending unit may be an output unit, for example, an output circuit or a communications interface. When the communications apparatus is a device, the receiving unit may be a receiver (which may also be referred to as a receiver); and the sending unit may be a transmitter (which may also be referred to as a transmitter).

In one embodiment, the configuration information further includes information used to determine a pilot pattern and a pilot sequence.

This application further provides another communication method and another communications apparatus, to resolve insufficient pilots and a pilot collision between terminal devices that are caused when an excessive quantity of terminal devices are accessed.

According to a fifth aspect of this application, a communication method is provided. The method includes: receiving, by a terminal device, configuration information that is of a pilot used for physical layer data demodulation and that is sent by a network device, where the configuration information of the pilot is configuration information of a first type or configuration information of a second type, where the configuration information of the first type includes information used to determine a pilot pattern and a pilot sequence, a sending period of the pilot, and information used to determine a sending location of the pilot in the sending period; and the configuration information of the second type includes spreading code information and information used to determine a pilot pattern and a pilot sequence, and the spreading code information is used to determine pilots sent in a plurality of subframes; and sending, by the terminal device, the pilot based on the configuration information of the pilot. In this aspect, a multiplexing pilot is configured between a plurality of terminal devices, so that when a quantity of pilots is insufficient, more terminal devices can still be accessed, and pilot collisions between terminal devices are reduced as much as possible.

In one embodiment, the method includes: receiving, by a terminal device, configuration information that is of at least one pilot used for physical layer data demodulation and that is sent by a network device, where the configuration information of the at least one pilot includes configuration information of a first type or configuration information of a second type, where the configuration information of the first type includes information used to determine a pilot pattern and a pilot sequence, a sending period of the pilot, and information used to determine a sending location of the pilot in the sending period; and the configuration information of the second type includes spreading code information and information used to determine a pilot pattern and a pilot sequence, and the spreading code information is used to determine pilots sent in a plurality of subframes; and selecting, by the terminal device, configuration information of one pilot from the configuration information of the at least one pilot, and sending the pilot based on the selected configuration information of the pilot. In this implementation, the network device configures configuration information of several pilots by using broadcast or RRC signaling or in a preset manner. The configuration information of the pilots forms an optional set of the pilots. The terminal device randomly selects a pilot from the set. The configuration information of the pilot is configuration information of a first type or configuration information of a second type, where the configuration information of the first type includes information used to determine a pilot pattern and a pilot sequence, a sending period of the pilot, and information used to determine a sending location of the pilot in the sending period; and the configuration information of the second type includes spreading code information and information used to determine a pilot pattern and a pilot sequence, and the spreading code information is used to determine pilots sent in a plurality of subframes; and the terminal device sends the pilot based on the configuration information of the pilot. A pilot is multiplexed in a plurality of transmissions, so that a quantity of available pilots in a pilot set is increased, and pilot collisions between terminal devices are reduced as much as possible.

Correspondingly, according to a sixth aspect of this application, a communications apparatus is provided, and can implement the foregoing communication method. For example, the communications apparatus may be a chip (such as a baseband chip or a communications chip) or a device (such as a terminal device). The foregoing method may be implemented by using software, hardware, or hardware executing corresponding software.

In one embodiment, a structure of the communications apparatus includes a processor and a memory. The processor is configured to support the apparatus in performing a corresponding function in the foregoing communication method. The memory is configured to be coupled to the processor, and stores a program (instruction) and/or data that are/is necessary for the apparatus. In one embodiment, the communications apparatus may further include a communications interface, configured to support communication between the apparatus and another network element.

In one embodiment, the communications apparatus may include a receiving unit and a sending unit. The receiving unit and the sending unit are respectively configured to implement receiving and sending functions in the foregoing method. For example, the receiving unit is configured to receive configuration information that is of a pilot used for physical layer data demodulation and that is sent by a network device, where the configuration information of the pilot is configuration information of a first type or configuration information of a second type, where the configuration information of the first type includes information used to determine a pilot pattern and a pilot sequence, a sending period of the pilot, and information used to determine a sending location of the pilot in the sending period; and the configuration information of the second type includes spreading code information and information used to determine a pilot pattern and a pilot sequence, and the spreading code information is used to determine pilots sent in a plurality of subframes; and the sending unit is configured to send the pilot based on the configuration information of the pilot.

In one embodiment, the communications apparatus may include a receiving unit, a sending unit, and a processing unit. The receiving unit and the sending unit are respectively configured to implement receiving and sending functions in the foregoing method, and the processing unit is configured to implement a processing function in the foregoing method. For example, the receiving unit is configured to receive configuration information that is of at least one pilot used for physical layer data demodulation and that is sent by a network device, where the configuration information of the at least one pilot includes configuration information of a first type or configuration information of a second type, where the configuration information of the first type includes information used to determine a pilot pattern and a pilot sequence, a sending period of the pilot, and information used to determine a sending location of the pilot in the sending period; and the configuration information of the second type includes spreading code information and information used to determine a pilot pattern and a pilot sequence, and the spreading code information is used to determine pilots sent in a plurality of subframes; the processing unit is configured to select configuration information of one pilot from configuration information of the at least one pilot; and the sending unit is configured to send the pilot based on the selected configuration information of the pilot.

When the communications apparatus is a chip, the receiving unit may be an input unit, for example, an input circuit or an input communications interface; and the sending unit may be an output unit, for example, an output circuit or an output communications interface. When the communications apparatus is a device, the receiving unit may be a receiver (which may also be referred to as a receiver); and the sending unit may be a transmitter (which may also be referred to as a transmitter).

According to a seventh aspect of this application, a communication method is provided. The method includes: allocating, by a network device, a pilot used for physical layer data demodulation to a terminal device; and sending, by the network device, configuration information of the pilot to the terminal device, where the configuration information of the pilot is configuration information of a first type or configuration information of a second type, where the configuration information of the first type includes information used to determine a pilot pattern and a pilot sequence, a sending period of the pilot, and information used to determine a sending location of the pilot in the sending period; and the configuration information of the second type includes spreading code information and information used to determine a pilot pattern and a pilot sequence, and the spreading code information is used to determine pilots sent in a plurality of subframes. In this aspect, the network device configures a multiplexing pilot between a plurality of terminal devices, so that when a quantity of pilots is insufficient, more terminal devices can still be accessed, and pilot collisions between terminal devices are reduced as much as possible.

In one embodiment, the method includes: configuring, by a network device, a pilot used for physical layer data demodulation; and sending, by the network device, configuration information of at least one pilot used for physical layer data demodulation to the terminal device, where the configuration information of the at least one pilot includes configuration information of a first type or configuration information of a second type, where the configuration information of the first type includes information used to determine a pilot pattern and a pilot sequence, a sending period of the pilot, and information used to determine a sending location of the pilot in the sending period; and the configuration information of the second type includes spreading code information and information used to determine a pilot pattern and a pilot sequence, and the spreading code information is used to determine pilots sent in a plurality of subframes. In this implementation, the network device configures configuration information of several pilots by using broadcast or RRC signaling or in a preset manner. The configuration information of the pilots forms an optional set of the pilots. The terminal device randomly selects a pilot from the set. The configuration information of the pilot is configuration information of a first type or configuration information of a second type, where the configuration information of the first type includes information used to determine a pilot pattern and a pilot sequence, a sending period of the pilot, and information used to determine a sending location of the pilot in the sending period; and the configuration information of the second type includes spreading code information and information used to determine a pilot pattern and a pilot sequence, and the spreading code information is used to determine pilots sent in a plurality of subframes; and the terminal device sends the pilot based on the configuration information of the pilot. A pilot is multiplexed in a plurality of transmissions, so that a quantity of available pilots in a pilot set is increased, and pilot collisions between terminal devices are reduced as much as possible.

Correspondingly, according to an eighth aspect of this application, a communications apparatus is provided, and can implement the foregoing communication method. For example, the communications apparatus may be a chip (such as a baseband chip or a communications chip) or a device (such as a network device or a baseband board). The foregoing method may be implemented by using software, hardware, or hardware executing corresponding software.

In one embodiment, a structure of the communications apparatus includes a processor and a memory. The processor is configured to support the apparatus in performing a corresponding function in the foregoing communication method. The memory is configured to be coupled to the processor, and stores a program (instruction) and data that are necessary for the apparatus. In one embodiment, the communications apparatus may further include a communications interface, configured to support communication between the apparatus and another network element.

In one embodiment, the communications apparatus may include a processing unit and a sending unit. The processing unit and the sending unit are respectively configured to implement processing and sending functions in the foregoing method. For example, the processing unit is configured to allocate a pilot used for physical layer data demodulation to a terminal device; and the sending unit is configured to send configuration information of the pilot to the terminal device, where the configuration information of the pilot is configuration information of a first type or configuration information of a second type, where the configuration information of the first type includes information used to determine a pilot pattern and a pilot sequence, a sending period of the pilot, and information used to determine a sending location of the pilot in the sending period; and the configuration information of the second type includes spreading code information and information used to determine a pilot pattern and a pilot sequence, and the spreading code information is used to determine pilots sent in a plurality of subframes.

In one embodiment, the communications apparatus may include a processing unit and a sending unit. The processing unit and the sending unit are respectively configured to implement processing and sending functions in the foregoing method. For example, the processing unit is configured to configure a pilot used for physical layer data demodulation; and the sending unit is configured to send configuration information of at least one pilot used for physical layer data demodulation to the terminal device, where the configuration information of the at least one pilot includes configuration information of a first type or configuration information of a second type, where the configuration information of the first type includes information used to determine a pilot pattern and a pilot sequence, a sending period of the pilot, and information used to determine a sending location of the pilot in the sending period; and the configuration information of the second type includes spreading code information and information used to determine a pilot pattern and a pilot sequence, and the spreading code information is used to determine pilots sent in a plurality of subframes.

When the communications apparatus is a chip, the receiving unit may be an input unit, for example, an input circuit or a communications interface; and the sending unit may be an output unit, for example, an output circuit or a communications interface. When the communications apparatus is a device, the receiving unit may be a receiver (which may also be referred to as a receiver); and the sending unit may be a transmitter (which may also be referred to as a transmitter).

In one embodiment, the information used to determine the sending location of the pilot in the sending period includes an offset location of the pilot in the sending period. In this implementation, the information for determining the sending location of the pilot in the sending period may be the offset location of the pilot in the sending period, and indication signaling overheads are low. Certainly, the information for determining the sending location of the pilot in the sending period may alternatively be an actual location of the pilot in the sending period.

In one embodiment, the sending period of the pilot is specifically N subframes, and N>1. In this implementation, pilot multiplexing is performed between a plurality of terminal devices, so that for each terminal device, the sending period of the pilot is greater than one subframe.

In one embodiment, the information used to determine the pilot pattern and the pilot sequence includes: a pilot pattern index and a pilot sequence generation parameter index, or a pilot port index, where each pilot port index corresponds to a combination of a pilot pattern and a pilot sequence generation parameter.

According to a ninth aspect of this application, a computer-readable storage medium is provided. The computer-readable storage medium stores an instruction, and when the instruction runs on a computer, the computer is enabled to perform the method according to each of the foregoing aspects.

A tenth aspect of this application provides a computer program product including an instruction. When the computer program product runs on a computer, the computer is enabled to perform the method according to each of the foregoing aspects.

BRIEF DESCRIPTION OF DRAWINGS

To describe the technical solutions in the embodiments of the present invention or in the background more clearly, the following briefly describes the accompanying drawings required for describing the embodiments of the present invention or the background.

DESCRIPTION OF EMBODIMENTS

The following describes embodiments of the present invention with reference to the accompanying drawings in the embodiments of the present invention.

Figure 1:
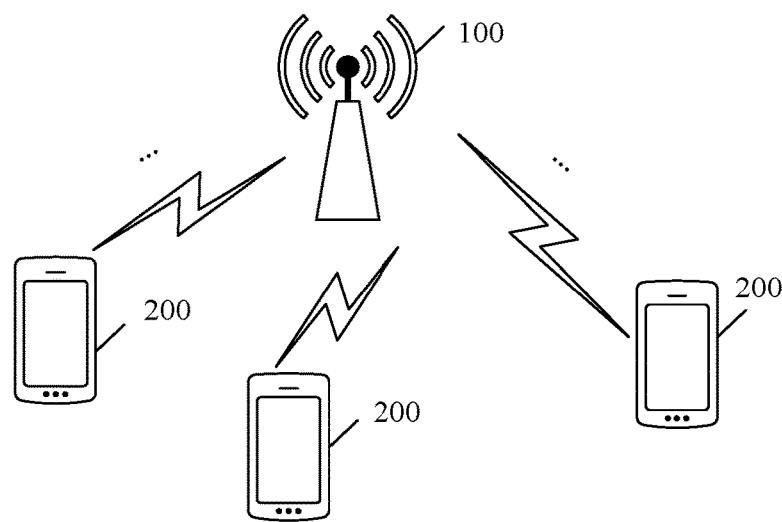
FIG. 1 is a schematic structural diagram of a communications system according to an embodiment of the present invention.

FIG. 1 is a schematic structural diagram of a communications system according to an embodiment of the present invention. The communications system may include at least one network device 100 (only one network device 100 is shown) and one or more terminal devices 200 connected to the network device 100.

The network device 100 may be a device that can communicate with the terminal device 200. The network device 100 may be any device with a wireless transceiver function, and includes but is not limited to: a base station (for example, a NodeB NodeB, an evolved NodeB eNodeB, a gNodeB in a fifth generation (5G) communications system, a base station or network device in a future communications system, an access node in a Wi-Fi system, a wireless relay node, and a wireless backhaul node) and so on. The network device 100 may alternatively be a radio controller in a cloud radio access network (CRAN) scenario. The network device 100 may alternatively be a network device in a 5G network or a network device in a future evolved network; or may be a wearable device, a vehicle-mounted device, or the like. The network device 100 may alternatively be a small cell, a transmission node (TRP), or the like. Certainly, this application is not limited thereto.

The terminal device 200 is a device that has a wireless transceiver function, may be deployed on land, and includes an indoor device, an outdoor device, a handheld device, a wearable device, or a vehicle-mounted device; or may be deployed on water (such as a ship); or may be deployed in air (such as an aircraft, a balloon, and a satellite). The terminal device may be a mobile phone, a tablet computer (Pad), a computer with a wireless transceiver function, a virtual reality (VR) terminal device, an augmented reality (AR) terminal device, a wireless terminal in industrial control, a wireless terminal in self driving, a wireless terminal in telemedicine (remote medical), a wireless terminal in smart grid, a wireless terminal in transportation safety, a wireless terminal in smart city, a wireless terminal in smart home, or the like. An application scenario is not limited in the embodiments of this application. The terminal device sometimes may also be referred to as user equipment (UE), an access terminal device, a UE unit, a UE station, a mobile station, a mobile station, a remote station, a remote terminal device, a mobile device, a UE terminal device, a terminal device, a terminal (terminal), a wireless communications device, a UE agent, a UE apparatus, or the like.

It should be noted that the terms "system" and "network" may be used interchangeably in the embodiments of the present invention. "A physical of" means two or more. In view of this, "a physical of" may also be understood as "at least two" in the embodiments of the present invention. The term "and/or" describes an association relationship for describing associated objects and represents that three relationships may exist. For example, A and/or B may represent the following three cases: Only A exists, both A and B exist, and only B exists. In addition, the character "/" generally indicates an "or" relationship between the associated objects. In addition, to clearly describe the technical solution in the embodiments of this application, in the embodiments of this application, terms such as "first" and "second" are used to distinguish between same items or similar items that have basically same functions and purposes. A person skilled in the art may understand that the terms, such as "first" and "second", are not intended to limit a quantity or an execution sequence; and the terms, such as "first" and "second", do not indicate a definite difference.

According to one aspect of this application, a communication method and a communications apparatus are provided. In K repeated transmissions, a terminal device needs to configure only one pilot for each terminal device, so that pilot overheads are low and pilot utilization is high.

Figure 2:
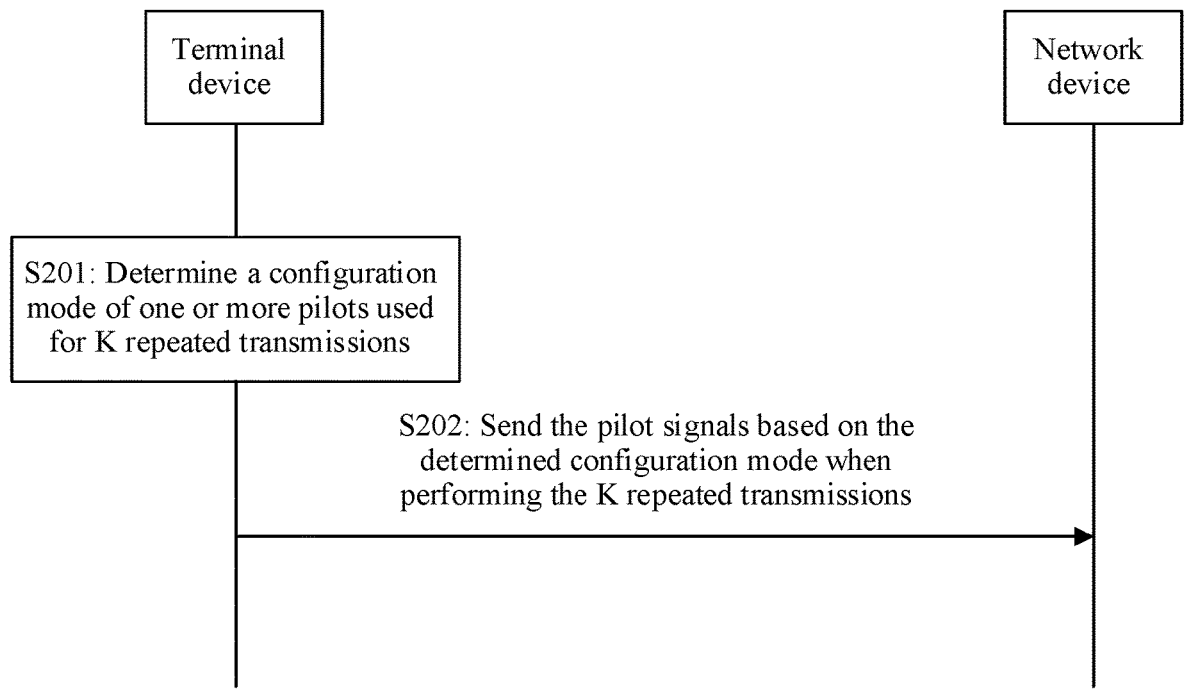
FIG. 2 is a schematic interaction flowchart of a communication method according to an embodiment of the present invention.

FIG. 2 is a schematic interaction flowchart of a communication method according to an embodiment of the present invention. The method may include the following operations:

S201: A terminal device determines a configuration mode of one or more pilots used for K repeated transmissions, where the configuration mode includes at least one of the following modes: a first configuration mode, a second configuration mode, or a third configuration mode, and in the first configuration mode, the terminal device sends a same pilot in each of first N of the K repeated transmissions, and does not send a pilot in remaining K−N transmissions; in the second configuration mode, the terminal device sends a first pilot in each of first N of the K repeated transmissions, and sends a second pilot in each of remaining K−N transmissions; in the third configuration mode, the terminal device sends the first pilot in each transmission in a first round of K transmissions, and sends the second pilot in each transmission in a second round of K transmissions, where the first round of K transmissions is adjacent to the second round of K transmissions, a pilot pattern of the second pilot is the same as a pilot pattern of the first pilot, a pilot sequence of the second pilot is obtained after minus one is multiplied by a pilot sequence generated by the first pilot in a subframe in which the first pilot is located, K≥2, and N is a positive integer less than K.

S202: The terminal device sends the pilots based on the determined configuration mode when performing the K repeated transmissions. The network device receives the pilots sent by the terminal device based on the configuration mode determined based on the configuration information.

In this embodiment, the terminal device repeatedly sends a same data packet for K times, to improve data transmission reliability, where K≥2. When sending physical layer data to the network device, the terminal device further needs to send a pilot. The network device determines, by detecting the pilot, whether the terminal device transmits the data in a current subframe. In other words, the pilot is used to demodulate the physical layer data. The physical layer data may be user data and control information. The pilot may be a demodulation reference signal (demodulation reference signal, DMRS), or may be a user equipment-specific reference signal (UE specific reference signal).

The terminal device determines the configuration mode of the pilots used for the K repeated transmissions. Specifically, in one embodiment, before S201, the method may further include the following operation: The network device sends the configuration information to the terminal device, where the configuration information is used to determine the configuration mode of the pilots used for the K repeated transmissions of the terminal device. In this case, S202 is specifically: The terminal device receives the configuration information sent by the network device. In one embodiment, the network device may alternatively pre-negotiate with the terminal device, to determine the configuration mode of the pilots by using a protocol.

For the K repeated transmissions, the configuration mode of the pilots includes at least one of the following modes: the first configuration mode, the second configuration mode, and the third configuration mode.

In the first configuration mode, the terminal device sends the same pilot in each of the first N of the K repeated transmissions, and does not send a pilot in the remaining K−N transmissions. K≥2, and N is a positive integer less than K. N may be 1 or any value between 1 and K. For example, N may be 1. To be specific, the terminal device sends the pilot only in the first transmission, and does not send a pilot in remaining (K−1) transmissions. Generally, that the terminal device does not send a pilot means that the terminal device does not perform an operation at a time-frequency location occupied by the pilot, that is, does not send a signal. Further, that the terminal device sends the same pilot in each of the first N transmissions may be that the terminal device sends a first pilot in each transmission, or may be that the terminal device sends a second pilot in each transmission. In this application, the pilot is a pilot signal corresponding to a pilot parameter configuration. The pilot parameter configuration includes configurations of a pilot pattern and a pilot sequence generation parameter. Particularly, the pilot sequence generation parameter does not include a parameter related to a time domain resource (in other words, the pilot parameter configuration does not include the parameter related to the time domain resource). In actual application, when a pilot sequence is generated for a specific subframe (or a specific slot), in addition to the pilot sequence generation parameter configured in the pilot parameter configuration, a subframe number of the specific subframe (or a slot number of the specific slot) is also used. In this application, whether two pilots are the same means whether pilot parameter configurations of the two pilots are the same. Same pilots mean same pilot parameter configurations. To be specific, pilot patterns occupied in a subframe are the same, and pilot sequences are generated based on a same algorithm and a same pilot sequence generation parameter. The same pilot sequence generation parameter does not include the parameter related to the time domain resource, for example, a slot number, a subframe number, or a frame number. A pilot pattern of the second pilot is the same as a pilot pattern of the first pilot, and a pilot sequence of the second pilot is obtained after minus one is multiplied by a pilot sequence generated by the first pilot in a subframe in which the first pilot is located. In this configuration mode, each terminal device is allocated with at most only one pilot. This reduces pilot overheads. In addition, the pilots may be sent only in some subframes. When a pilot is sent in a subframe and no pilot is sent in a subframe, energy detected by the network device changes abruptly.

In the second configuration mode, the terminal device sends the first pilot in each of the first N of the K repeated transmissions, and sends the second pilot in each of the remaining K−N transmissions. A pilot pattern of the second pilot is the same as a pilot pattern of the first pilot, a pilot sequence of the second pilot is obtained after minus one is multiplied by a pilot sequence generated by the first pilot in a subframe in which the first pilot is located, K≥2, and N is a positive integer less than K. In this configuration mode, a pilot is sent in each subframe of the K repeated transmissions, but the first pilot is sent in each of the first N of the K repeated transmissions, and the second pilot is sent in each of the remaining K−N transmissions.

In the third configuration mode, the terminal device sends the first pilot in each transmission in the first round of K repeated transmissions, and sends the second pilot in each transmission in the second round of K repeated transmissions. The first round of K repeated transmissions is adjacent to the second round of K repeated transmissions. A pilot pattern of the second pilot is the same as a pilot pattern of the first pilot, a pilot sequence of the second pilot is obtained after minus one is multiplied by a pilot sequence generated by the first pilot in a subframe in which the first pilot is located, K≥2, and N is a positive integer less than K. In this configuration mode, a pilot is sent in each subframe of the K repeated transmissions, but pilot patterns of the pilots sent in two consecutive rounds of K repeated transmissions are the same. In the third configuration mode, a process of generating the pilot sequence of the second pilot may be considered as: A pilot sequence (namely, the pilot sequence of the first pilot) corresponding to a subframe in which the second pilot is located is generated based on a pilot sequence generation parameter of the first pilot, and then an obtained pilot sequence is multiplied by minus one, to obtain the pilot sequence of the second pilot.

Further, the configuration information further includes information used to determine a pilot pattern and a pilot sequence. The information used to determine the pilot pattern and the pilot sequence includes: a pilot pattern index and a pilot sequence generation parameter index, or a pilot port index. Specifically, in one embodiment, the information used to determine the pilot pattern and the pilot sequence includes: the pilot pattern index and the pilot sequence generation parameter index. Herein, the pilot pattern is a location to which the pilot sequence is mapped and that is on a time-frequency resource. The pilot sequence generation parameter and the pilot pattern can be used to determine the sent pilot. It should be noted that the time-frequency resource of the pilot and the pilot sequence of the pilot may be separately configured. In one embodiment, the information used to determine the pilot pattern and the pilot sequence includes: the pilot pattern index and the pilot sequence generation parameter. In one embodiment, the information used to determine the pilot pattern and the pilot sequence includes the pilot port index. A pilot determined by one group of a pilot pattern and a pilot sequence generation parameter is sent by a determined port. In other words, each pilot port index corresponds to a combination of a pilot pattern and a pilot sequence generation parameter. Therefore, the pilot port index may also be used to determine information about the pilot pattern and the pilot sequence.

After determining the configuration mode of the pilots used for the K repeated transmissions, the terminal device sends the pilots based on the determined configuration mode when performing the K repeated transmissions. The network device receives the pilots sent by the terminal device based on the determined configuration mode, and demodulates transmitted data based on the received pilots.

Specifically, the network device receives a signal of each subframe. The network device first determines a type of a current subframe through pilot detection. A specific demodulation and decoding process is as follows:

If the network device determines that there is no signal sent by any terminal device in the current subframe, no further processing is performed.

If the network device determines that the current subframe is a subframe of the first transmission of a terminal device, the network device performs channel estimation by using a pilot in the current subframe, and demodulates and decodes a data signal in the current subframe based on a result of the channel estimation. If the decoding succeeds, the network device determines that subsequent K−1 subframes are all retransmission subframes for the terminal device. Therefore, during subframe processing, the terminal device is directly skipped, that is, no processing is performed. If the decoding fails, the network device continues to process a received signal of a next subframe for the terminal device, and sets the current subframe as the subframe of the first transmission.

If the network device determines that the current subframe is a retransmission subframe of a terminal device, it is assumed that the current subframe number is k, and a subframe number of the first transmission is k0. This is described by using the following cases: (a) If the terminal device transmits a pilot in the current subframe, the network device performs channel estimation based on the pilot, and demodulates and decodes a data signal in the current subframe based on a result of the channel estimation. Alternatively, the network device may combine a data signal in the current subframe and data signals in preceding k−k0 subframes, and then perform demodulation and decoding. Alternatively, the network device may first demodulate a data signal in the current subframe based on a channel estimation result, combine a demodulation result with demodulation results in preceding k−k0 subframes, and then perform decoding. (b) If the terminal device does not transmit a pilot in the current subframe, the network device uses one or more channel estimation results in one or more preceding subframes as a channel estimation result of the current subframe. The network device demodulates and decodes a data signal in the current subframe based on the channel estimation result. Alternatively, the network device may combine a data signal in the current subframe and data signals in preceding k−k0 subframes, and then perform demodulation and decoding. Alternatively, the network device may first demodulate a data signal in the current subframe based on a channel estimation result, combine a demodulation result with demodulation results in preceding k−k0 subframes, and then perform decoding. If the decoding succeeds, the network device determines that subsequent K−(k−k0+1) subframes are all retransmission subframes for the terminal device. Therefore, during subframe processing, the terminal device is directly skipped, and no processing is performed. If the decoding fails, the network device continues to process a received signal of a next subframe for the terminal device.

If the determined configuration mode is the second configuration mode or the third configuration mode, the subframe of the first transmission may be determined based on the configuration mode. Specifically, if the determined configuration mode is the second configuration mode, it may be determined that an $N^{th}$ subframe counted backward from a subframe whose phase jumps is the subframe of the first transmission. If the determined configuration mode is the third configuration mode, it may be determined that the first subframe after a phase jump is the subframe for the first transmission.

In the third configuration mode, the network device may demodulate, by using the first pilot, data in each transmission in the first round of K repeated transmissions until the demodulation succeeds; and may demodulate, by using the second pilot, data in each transmission in the second round of K repeated transmissions until the demodulation succeeds.

In this embodiment, each terminal device is allocated with at most only one pilot. This reduces pilot overheads. In addition, the pilots may be sent only in some subframes or all subframes, and configuration modes of the pilots are diversified. The network device may demodulate data based on the pilots sent in some or all subframes of the K repeated transmissions.

The K repeated transmissions include an initial transmission (namely, the first transmission) and a retransmission. The network device needs to determine the first transmission in the K repeated transmissions. In this case, the method may further include the following operation: The network device determines, based on an abrupt energy change or phase change of the received pilots, a subframe (namely, an initial transmission subframe) in which the first of the K repeated transmissions of the terminal device is performed. In this way, the network device needs to allocate only one pilot to the terminal device to identify the subframe of the first transmission. This reduces pilot overheads.

The following separately describes how to identify an initial transmission subframe in configuration modes of a plurality of pilots.

In one embodiment, in the first configuration mode, the terminal device may be configured to send pilots in some subframes. That the terminal device sends a pilot in a subframe and the terminal device does not send a pilot in a subframe cause an abrupt change in detected energy. Therefore, the network device may determine the initial transmission subframe based on an abrupt energy change of received pilots.

Figure 3:
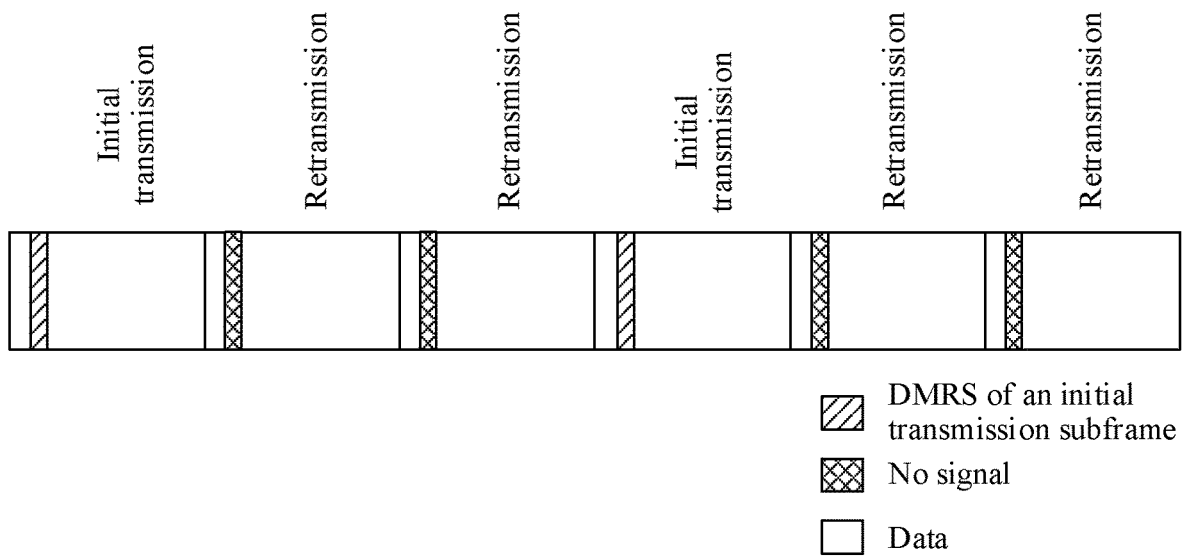
FIG. 3 is a schematic diagram of an example of pilot configuration of a terminal device.

Specifically, in an example, FIG. 3 is a schematic diagram of an example of pilot configuration of the terminal device. The terminal device sends a pilot only in an initial transmission subframe, and does not send a pilot in any other subframe, namely, N=1. A specific process in which the network device determines the initial transmission subframe sent by the terminal device is as follows.

The terminal device transmits data to the network device for K times in K subframes.

Operation 1: The network device receives a signal in a subframe, and determines that a type of the current subframe is an initial transmission subframe, a retransmission subframe, or a subframe without data.

If a pilot is detected in preceding K−1 subframes that are of the current subframe and that may be used by the terminal device for transmission, pilot detection may be performed on the current subframe, or pilot detection may not be performed. The subframes used by the terminal device for transmission mean that the terminal device may transmit data by using the subframes, but may not necessarily transmit data by using all the subframes. Specifically, if pilot detection is performed, but no pilot is detected, or a metric value of a detected pilot is less than a maximum value of pilot detection metric values of the preceding K−1 subframes, it is considered that the subframe is a retransmission subframe.

The initial transmission subframe is a subframe having a largest pilot detection metric value in the preceding K−1 subframes. Otherwise, the subframe is considered as the initial transmission subframe. The metric value is obtained after cross-correlation calculation is performed on a received signal and a local pilot, and represents (or is used to determine) a similarity between the received signal and the local pilot.

If the pilot detection is not performed, it is considered that no pilot is detected in the subframe, and the subframe is considered as a retransmission subframe.

If no pilot is detected in the preceding K−1 subframes, pilot detection is performed on the subframe. If the pilot is detected in the subframe, the subframe is considered as the initial transmission subframe; or, if no pilot is detected in the subframe, it is considered that the terminal device does not send uplink data in the subframe, in other words, the subframe is a subframe without data.

Operation 2: The network device demodulates and decodes a subframe k.

If the subframe k is an initial transmission subframe, the network device performs channel estimation based on the pilot, and performs demodulation and decoding. If the decoding succeeds, the network device skips a processing process (including a pilot detection process, and a data demodulation and decoding process) of subsequent K−1 subframes for the terminal device, that is, updates k'=k+K. If the decoding fails, the network device continues to detect a subframe k+1.

If the subframe k is a retransmission subframe, the network device performs combined decoding on subframes (including the initial transmission subframe and the subframe k) between the initial transmission subframe and the subframe k based on a channel estimation value of the initial transmission subframe; and if the decoding succeeds, the network device skips a processing process (including a pilot detection process, and a data demodulation and decoding process) of remaining K−k subframes for the terminal device; or if the decoding fails, the network device continues to detect a subframe k+1.

In another example, the terminal device repeatedly transmits data to the network device for K times in K subframes, and the terminal device sends pilots in first N subframes, but does not send any signal in pilot locations in subsequent E subframes. N=2 to K−1, and E is set to K−N, to indicate a quantity of subframes in which no pilot is sent in the K subframes. A specific process of identifying an initial transmission subframe by the network device is as follows.

Operation 1: Determine that a subframe k is an initial transmission subframe, a retransmission subframe, or a subframe without data.

If a pilot is detected in a kth subframe, and no pilot is detected in first (k−1) subframes, the subframe is considered as an initial transmission subframe.

If no pilot is detected in the kth subframe, but a pilot is detected in first k−1 subframes, the subframe is considered as a retransmission subframe.

Operation 2: The network device demodulates and decodes the subframe k. For a demodulation and decoding process of the network device, refer to the demodulation and decoding process when N=1. Details are not described herein again.

In one embodiment, in the second configuration mode, there is an abrupt phase change between a pilot in the first N transmissions and a pilot in the remaining K−N. Alternatively, when the terminal device is just powered on, there may be an abrupt change between energy of the terminal device that is not powered on and a pilot in the first transmission. The network device may determine an initial transmission subframe based on the abrupt energy change and/or the abrupt phase change. For example, it is assumed that pilots received in two subframes are respectively $p1(i)$ and $p2(i)$, where $p1(i)$ represents an $i^{th}$ element in the first pilot, $p2(i)$ represents an $i^{th}$ element in the second pilot, $1<=i<=N_0$, and $N_0$ is a length of a pilot sequence (a quantity of included elements). C is set to $\text{sum\_i}(p1(i)*\text{conj}(p2(i)))/N0$. If abs(C) is relatively large, and angle(C) is slightly different from pi or −pi, it is determined that an abrupt phase change occurs. conj( ) indicates performing a conjugate operation, sum_i( ) indicates performing summation on a sequence number i, angle( ) indicates performing a phase operation, and abs( ) indicates performing a modulo operation.

In one embodiment, in the third configuration mode, the network device may determine an initial transmission subframe based on the abrupt energy change or the abrupt phase change. Specifically, when there is no idle subframe between the first round of K repeated transmissions and the second round of K repeated transmissions, there is the abrupt phase change between a pilot in the first round of K repeated transmissions and a pilot in the second round of K repeated transmissions. When there is an idle subframe between the first round of K repeated transmissions and the second round of K repeated transmissions, the network device may determine the initial transmission subframe based on the abrupt energy change.

In the preceding descriptions, only one pilot, namely, a single pilot, is configured for the terminal device. However, when a quantity of terminal devices accessing a network decreases and a quantity of pilots is sufficient, the configuration mode of the pilots may be switched from a single-pilot configuration mode to a dual-pilot configuration mode. In the dual-pilot configuration mode, different pilots are used in an initial transmission subframe and a retransmission subframe. Therefore, the dual-pilot configuration mode can be used to quickly determine the initial transmission subframe and the retransmission subframe. This improves channel estimation accuracy and increases a decoding success probability. In this case, the method may further includes the following operation: The network device sends a configuration switch indication of the pilots to the terminal device, where the configuration switch indication is used to instruct the terminal device to switch a current configuration mode of the pilots to a previously configured dual-pilot configuration mode, and in the dual-pilot configuration mode, a third pilot is sent in the first of the K repeated transmissions, and a fourth pilot is sent in one or more other of the K repeated transmissions, where a pilot sequence of the fourth pilot cannot be expressed as a product of a constant and a pilot sequence of the third pilot in a subframe in which the fourth pilot is located, or a pilot pattern of the third pilot is different from a pilot pattern of the fourth pilot; the terminal device receives the configuration switch indication of the pilots; and the terminal device switches the current configuration mode of the pilots to the previously configured dual-pilot configuration mode based on the configuration switch indication. Specifically, the pilot sequence of the fourth pilot cannot be expressed as a product of a constant and the pilot sequence of the third pilot in the subframe in which the fourth pilot is located. In other words, a proportional relationship between a corresponding element in the pilot sequence of the fourth pilot and a corresponding element in the pilot sequence of the third pilot is not a constant. For example, an $i^{th}$ element in the pilot sequence of the third pilot is p(i), where $1<=i<=N_0$, an $i^{th}$ element in the pilot sequence of the fourth pilot is C*pi(i), where C is any complex number, and the relationship is valid for $1<=i<=N_0$. In this case, the proportional relationship between a corresponding element in the pilot sequence of the third pilot and a corresponding element in the pilot sequence of the fourth pilot is a constant.

In addition, after receiving the configuration switch indication of the pilots that is sent by the network device, the terminal device may send an acknowledgment message to the network device. The configuration switch indication of the pilots may be sent by using radio resource control (RRC) signaling, downlink control information (DCI), or the like.

Certainly, for an accessed terminal device that has been configured to run in the dual-pilot configuration mode, the network device may send a configuration switch indication of the pilots, and reconfigure the terminal device to run in the single-pilot configuration mode. The network device recovers a retransmission pilot of the terminal device and reallocates the retransmission pilot to another newly accessed terminal device, to improve pilot utilization.

According to the embodiments of this application, a communication method is provided. In K repeated transmissions, a terminal device needs to configure only one pilot for each terminal device, so that pilot overheads are low and pilot utilization is high.

Grant-free (GF) transmission may mean: A network device pre-allocates at least one transmission resource and notifies a terminal device of the at least one transmission resource; when needing to transmit uplink data, the terminal device selects one or more transmission resources from the at least one transmission resource pre-allocated by the network device, and uses the selected transmission resources to send the uplink data; and the network device detects, on one or more transmission resources in the pre-allocated at least one transmission resource, the uplink data sent by the terminal device. The detection may be blind detection, or may be detection performed based on a control domain in the uplink data, or may be detection performed in another manner. If the network device pre-allocates only one transmission resource to the terminal device, when the terminal device needs to transmit uplink data, the terminal device directly uses the pre-allocated transmission resource to send the uplink data.

In the grant-free transmission mode, by detecting one or more pilots sent by the terminal device, the network device identifies the terminal device or an initial transmission subframe. A quantity of pilots that can be used in the grant-free mode is limited. If excessive terminal devices are accessed, the quantity of pilots is insufficient.

When the quantity of pilots is insufficient, the following problems occur: If the pilots are all allocated by the network device, the network device rejects access of a new terminal device or forcibly releases some terminal devices that have been accessed; or if a pilot is randomly selected by the terminal device within a range, a probability of selecting a same pilot by a plurality of terminal devices (where this case is referred to as a pilot collision) is greatly increased.

According to another aspect of this application, another communication method and another communications apparatus are provided. A multiplexing pilot is configured between a plurality of terminal devices, so that when a quantity of pilots is insufficient, more terminal devices can still be accessed, and pilot collisions between terminal devices are reduced as much as possible.

Figure 4:
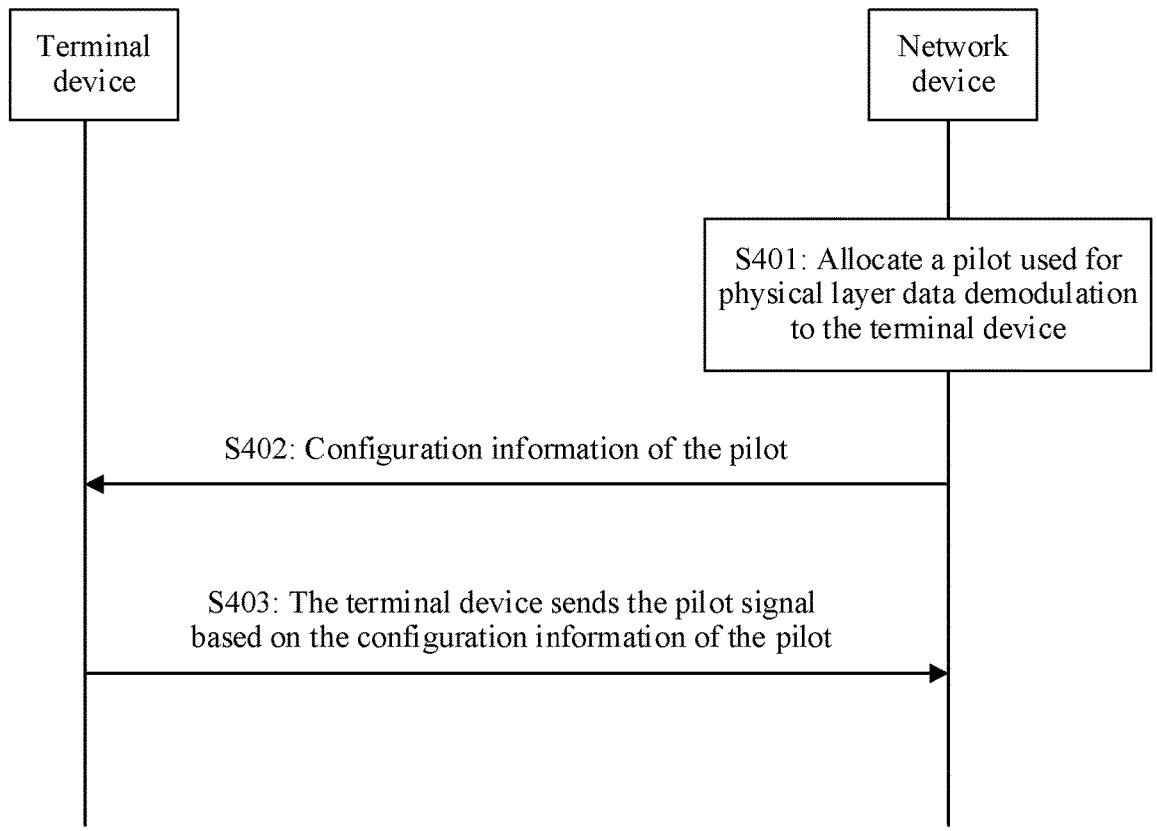
FIG. 4 is a schematic interaction flowchart of another communication method according to an embodiment of the present invention.

FIG. 4 is a schematic interaction flowchart of another communication method according to an embodiment of the present invention. The method may include the following operations:

S401: A network device allocates a pilot used for physical layer data demodulation to a terminal device.

S402: The network device sends configuration information of the pilot to the terminal device, where the configuration information of the pilot is configuration information of a first type or configuration information of a second type, where the configuration information of the first type includes information used to determine a pilot pattern and a pilot sequence, a sending period of the pilot, and information used to determine a sending location of the pilot in the sending period; and the configuration information of the second type includes spreading code information and information used to determine a pilot pattern and a pilot sequence, and the spreading code information is used to determine pilots sent in a plurality of subframes.

S403: The terminal device receives the configuration information that is of the pilot used for physical layer data demodulation and that is sent by the network device, and the terminal device sends the pilot based on the configuration information of the pilot.

When sending physical layer data to the network device, the terminal device further needs to send a pilot. The pilot is used to demodulate the physical layer data. The physical layer data may be user data and/or control information. The pilot may be a DMRS, or may be a user equipment-specific reference signal.

In this embodiment, the network device allocates the pilot used for physical layer data demodulation to the terminal device, to generate the configuration information. Considering that there are excessive terminal devices and pilot resources are insufficient, in this embodiment, a plurality of terminal devices are configured to perform time division multiplexing or code division multiplexing on a pilot. Therefore, the configuration information of the pilot includes the configuration information of the first type and the configuration information of the second type.

The configuration information of the first type corresponds to a time division multiplexing configuration mode, and the configuration information of the first type includes the information used to determine the pilot pattern and the pilot sequence, the sending period of the pilot, and the information used to determine the sending location of the pilot in the sending period.

The information used to determine the pilot pattern and the pilot sequence includes: a pilot pattern index and a pilot sequence generation parameter index, or a pilot port index. Specifically, in one embodiment, the information used to determine the pilot pattern and the pilot sequence includes: the pilot pattern index and the pilot sequence generation parameter index. Herein, the pilot pattern is a location to which the pilot sequence is mapped and that is on a time-frequency resource. The pilot sequence and the pilot pattern can be used to determine the sent pilot. It should be noted that the time-frequency resource of the pilot and the pilot sequence of the pilot may be separately configured. In one embodiment, the information used to determine the pilot pattern and the pilot sequence includes the pilot port index. A pilot determined by one group of a pilot pattern and a pilot sequence generation parameter is sent by a determined port. In other words, each pilot port index corresponds to a combination of a pilot pattern and a pilot sequence generation parameter. Therefore, the pilot port index may also be used to determine information about the pilot pattern and the pilot sequence.

With respect to the information used to determine the sending location of the pilot in the sending period, in one embodiment, the information used to determine the sending location of the pilot in the sending period includes an offset location of the pilot in the sending period. In this manner, the sending location of the pilot is determined, and indication signaling overheads are low. In one embodiment, the information for determining the sending location of the pilot in the sending period may alternatively be an actual location or an absolute location of the pilot in the sending period.

Pilot multiplexing is performed between the plurality of terminal devices, so that for each terminal device, the sending period of the pilot is greater than one subframe. In other words, the sending period of the pilot is specifically N subframes, where N>1.

By using the configuration information of the first type, there is an offset between sending locations of the plurality of terminal devices in respective sending periods, so that the plurality of terminal devices can multiplex pilot resources between subframes in a time division manner.

The configuration information of the second type corresponds to a code division multiplexing configuration mode, and the configuration information of the second type includes the spreading code information and the information used to determine the pilot pattern and the pilot sequence.

The spreading code information is used to determine the pilots sent in the plurality of subframes.

The information used to determine the pilot pattern and the pilot sequence includes: a pilot pattern index and a pilot sequence index, or a pilot port index. Each pilot port index corresponds to a combination of a pilot pattern and a pilot sequence.

In this embodiment, the network device sends the configuration information of the pilot to the terminal device by using RRC signaling, a DCI message, or the like. Certainly, in another embodiment, the network device may pre-negotiate with the terminal device to determine the configuration information of the pilot by using a protocol.

By using the configuration information of the second type and configuring a pilot by using a spreading code, the plurality of terminal devices may multiplex pilot resources between subframes in a code division manner.

The terminal device receives the configuration information of the pilot that is sent by the network device, and sends the pilot based on the configuration information of the pilot. To be specific, if the configuration information of the pilot that is received by the terminal device is the configuration information of the first type, the terminal device sends pilot information based on the configuration information of the first type, that is, sends the configured pilot in the configured sending period of the pilot and at the configured sending location in the sending period. If the configuration information of the pilot that is received by the terminal device is the configuration information of the second type, the terminal device sends pilot information based on the configuration information of the second type, that is, sends the configured pilot in a determined subframe.

The following describes the foregoing pilot configuration and pilot sending in detail by using a specific example.

Figure 5:
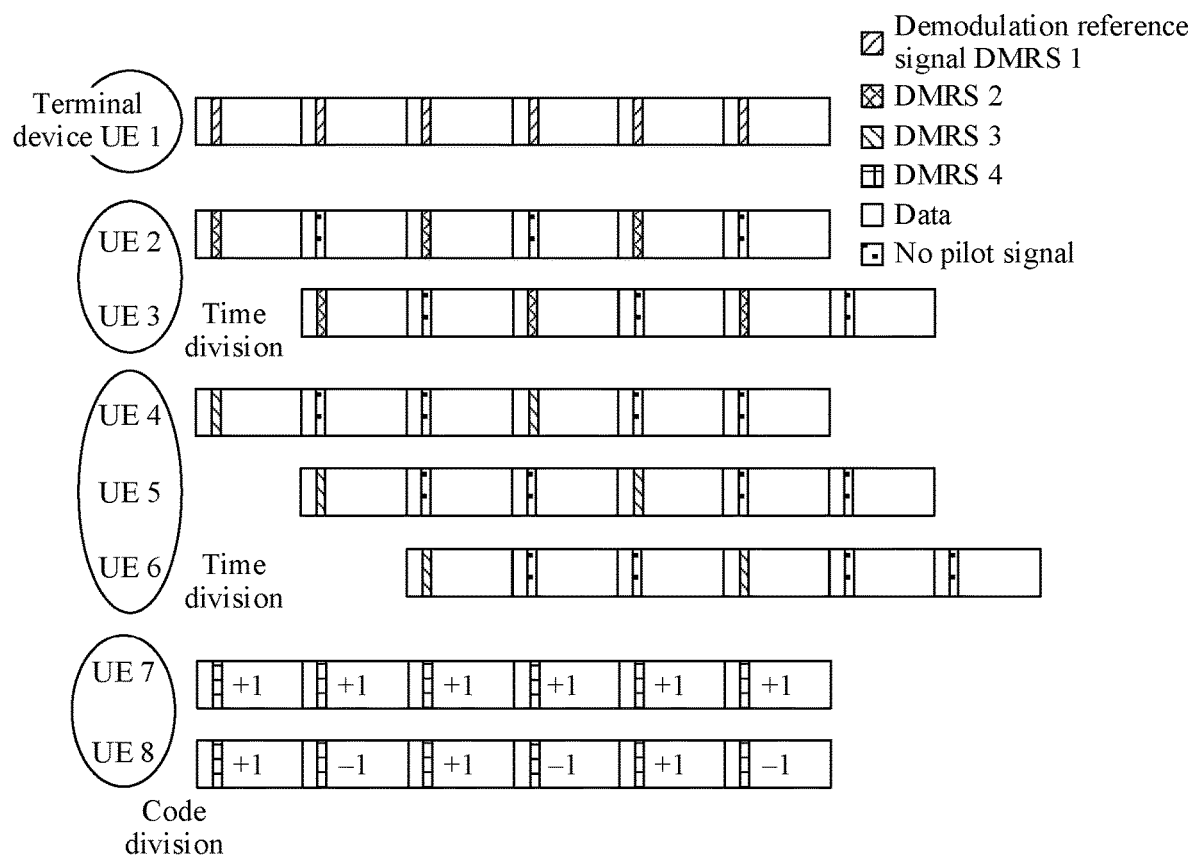
FIG. 5 is a schematic diagram of another example of pilot configuration of a terminal device.

In an example, FIG. 5 is a schematic diagram of another example of pilot configuration of the terminal device. Currently, a system has four available pilots (where for example, the pilots are DMRSs, namely, a DMRS 1 to a DMRS 4), and eight terminal devices are accessed.

A pilot allocated by a network device to each terminal device is as follows:

Terminal device 1: a pilot P1, T=1, I=0. The terminal device sends the pilot P1 in all subframes, and a start subframe is not limited. T is a sending period of the pilot, and a unit is a subframe. I is an offset position of the pilot relative to a reference subframe in the sending period, and the reference subframe is a subframe whose subframe number can be exactly divided by T.

Terminal device 2: a pilot P2, T=2, and I=0.
Terminal device 3: a pilot P2, T=2, and I=1.
Terminal device 4: a pilot P3, T=3, and I=0.
Terminal device 5: a pilot P3, T=3, and I=1.
Terminal device 6: a pilot P3, T=3, and I=2.

The pilot P2 and the pilot P3 are sent only in a subframe that meets the following condition: A remainder obtained after a subframe number is exactly divided by T is equal to I. A subframe number of a start subframe also needs to meet the foregoing condition. I=0 to T−1. If multiplexing a same pilot, different terminal devices select different I values. Specifically, for the pilot P2, the terminal device 2 selects I=0, and the terminal device 3 selects I=1. For the pilot P3, the terminal device 4 selects I=0, the terminal device 5 selects I=1, and the terminal device 6 selects I=2.

Terminal device 7: a pilot P4, spreading code={+1+1}, and I=0. The spreading code indicates that same pilots are sent in two consecutive subframes. In this example, the terminal device sends the pilot P4 in each of the two consecutive subframes.

Terminal device 8: a pilot P4, spreading code={+1−1}, and I=0. The spreading code indicates that pilots whose phases are opposite are sent in two consecutive subframes. In this example, the terminal device sends the pilot P4 in the former of the two consecutive subframes, and sends a pilot P4*$e^{j\pi}$ in the latter of the two consecutive subframes. In configuration modes of the terminal device 7 and the terminal device 8, start subframes of the two configuration modes are aligned, that is, I values are the same, for example, both are 0.

In this example, the terminal device 1 has no inter-subframe multiplexing. Subframe-level time division multiplexing is performed on the pilots of the terminal devices 2 and 3. Subframe-level time division multiplexing is performed on the pilots of the terminal devices 4 to 6. Subframe-level code division multiplexing is performed by the terminal devices 7 and 8.

For the pilot 1 sent by the terminal device 1, after receiving signals in the K subframes, the network device may demodulate, based on the pilot P1 in each subframe, data transmitted in the subframe. For the pilots P2 and P3 that are sent through time division multiplexing, after receiving signals in the K subframes, in a subframe in which a pilot exists, the network device demodulates, by using the pilot, data transmitted in the subframe, demodulates, by using pilots in all subframes in which the pilots exist, data transmitted in the K subframes, and does not detect a subsequent subframe after the data is demodulated. For the pilot P4 sent by the terminal device 7 through code division multiplexing, the network device demodulates a signal in each subframe by using the pilot P4 in each subframe, and does not detect a subsequent subframe after data is demodulated. For the pilot P4 sent by the terminal device 8 through code division multiplexing, the network device demodulates a signal in each corresponding subframe by using the pilot P4 or the pilot P4*$e^{j\pi}$ in each subframe, and does not detect a subsequent subframe after data is demodulated.

In another example, a system currently has four available pilots (a DMRS 1 to a DMRS 4), and eight terminal devices are accessed.

A pilot allocated by a network device to each terminal device is as follows:

Terminal device 1: a pilot P1, T=2, and I=0. The terminal device sends the pilot 1 in all subframes, and a start subframe is not limited. Definitions of T and I are the same as those in the preceding example.

Terminal device 2: a pilot P2, T=2, and I=0.
Terminal device 3: a pilot P2, T=2, and I=1.
Terminal device 4: a pilot P3, T=3, and I=0.
Terminal device 5: a pilot P3, T=3, and I=1.
Terminal device 6: a pilot P3, T=3, and I=2.
Terminal device 7: a pilot P4, T=2, and I=0.
Terminal device 8: a pilot P4, T=2, and I=1.

The pilot P2, the pilot P3, and the pilot P4 are sent only in a subframe that meets the following condition: A remainder obtained after a subframe number is exactly divided by T is equal to I. A subframe number of a start subframe also needs to meet the foregoing condition. I=0 to T−1. If multiplexing a same pilot, different terminal devices select different I values. Specifically, for the pilot P2, the terminal device 2 selects I=0, and the terminal device 3 selects I=1. For the pilot P3, the terminal device 4 selects I=0, the terminal device 5 selects I=1, and the terminal device 6 selects I=2. For the pilot P4, the terminal device 7 selects I=0, and the terminal device 8 selects I=1.

For the pilot 1 sent by the terminal device 1, after receiving signals in the K subframes, the network device may demodulate, based on the pilot P1 in each subframe, data transmitted in the subframe. For the pilots P2, P3, and P4 that are sent through time division multiplexing, after receiving signals in K subframes, in a subframe in which a pilot exists, the network device demodulates, by using the pilot, data transmitted in the subframe, and demodulates, by using pilots in all subframes in which the pilots exist, data transmitted in the K subframes, and does not detect a subsequent subframe after the data is demodulated.

In this example, the terminal device 1 has no inter-subframe multiplexing. Subframe-level time division multiplexing is performed on the pilots of the terminal devices 2 and 3. Subframe-level time division multiplexing is performed on the pilots of the terminal devices 4 to 6. Subframe-level time division multiplexing is performed on the pilots of the terminal devices 7 and 8.

In still another example, a system currently has four available pilots (a DMRS 1 to a DMRS 4), and eight terminal devices are accessed.

A pilot allocated by a network device to each terminal device is as follows:

Terminal device 1: a pilot P1, spreading code={+1+1}, and I=0. The terminal device sends the pilot 1, and a subframe number of a start subframe is an even number.

Terminal device 2: a pilot P1, spreading code={+1−1}, and I=0. The terminal device sends the pilot 1, and a subframe number of a start subframe is an even number.

Terminal device 3: a pilot P2, spreading code={+1+1}, and I=0. The terminal device sends the pilot 2, and a subframe number of a start subframe is an even number.

Terminal device 4: a pilot P2, spreading code={+1−1}, and I=0. The terminal device sends the pilot 2, and a subframe number of a start subframe is an even number.

Terminal device 5: a pilot P3, spreading code={+1+1}, and I=0. The terminal device sends the pilot 3, and a subframe number of a start subframe is an even number.

Terminal device 6: a pilot P3, spreading code={+1−1}, and I=0. The terminal device sends the pilot 3, and a subframe number of a start subframe is an even number.

Terminal device 7: a pilot P4, spreading code={+1+1}, and I=1. The terminal device sends the pilot 4, and a subframe number of a start subframe is an odd number.

Terminal device 8: a pilot P4, spreading code={+1−1}, and I=1. The terminal device sends the pilot 4, and a subframe number of a start subframe is an odd number.

In this example, subframe-level code division multiplexing is performed on the pilots of the terminal devices 1 and 2. Subframe-level code division multiplexing is performed on the pilots of the terminal devices 3 and 4. Subframe-level code division multiplexing is performed on the pilots of the terminal devices 5 and 6. Subframe-level code division multiplexing is performed by the terminal devices 7 and 8. The start subframes of terminal devices configured with the same pilots are aligned, that is, I vales are the same.

For the pilot P1 sent by the terminal device 1 through code division multiplexing, the network device demodulates a signal in each subframe by using the pilot P1 in each subframe, and does not detect a subsequent subframe after data is demodulated. For the pilot P1 sent by the terminal device 2 through code division multiplexing, the network device demodulates, by using the pilot P1 or the pilot P1*$e^{j\pi}$ in each subframe, a signal in the corresponding subframe, and does not detect a subsequent subframe after data is demodulated. Demodulation processes of the network device for the received subframes that are sent by the terminal devices 3 to 8 are the same, and details are not described herein again.

According to the communication method provided in this embodiment of the present invention, a multiplexing pilot is configured between a plurality of terminal devices, so that when a quantity of pilots is insufficient, more terminal devices can still be accessed, and pilot collisions between terminal devices are reduced as much as possible.

An embodiment of the present invention further provides another communication method, and the method includes the following operations.

A network device configures a pilot used for physical layer data demodulation.

The network device sends configuration information of at least one pilot used for physical layer data demodulation to a terminal device. The terminal device receives the configuration information of the pilot. The configuration information of the at least one pilot includes configuration information of a first type or configuration information of a second type. The configuration information of the first type includes information used to determine a pilot pattern and a pilot sequence, a sending period of the pilot, and information used to determine a sending location of the pilot in the sending period. The configuration information of the second type includes spreading code information and information used to determine a pilot pattern and a pilot sequence. The spreading code information is used to determine pilots sent in a plurality of subframes.

The terminal device selects configuration information of one pilot from the configuration information of the at least one pilot, and sends the pilot based on the selected configuration information of the pilot.

In this embodiment, the network device configures configuration information of several pilots by using broadcast or in a preset manner. The configuration information of the pilots forms an optional set of the pilots. The terminal device randomly selects a pilot based on the configuration information of the pilots that is configured by the network device. The configuration information of the pilot is configuration information of a first type or configuration information of a second type, where the configuration information of the first type includes information used to determine a pilot pattern and a pilot sequence, a sending period of the pilot, and information used to determine a sending location of the pilot in the sending period; and the configuration information of the second type includes spreading code information and information used to determine a pilot pattern and a pilot sequence, and the spreading code information is used to determine pilots sent in a plurality of subframes; and the terminal device sends the pilot based on the configuration information of the pilot. A pilot is multiplexed in a plurality of transmissions, so that a quantity of available pilots in a pilot set is increased, and pilot collisions between terminal devices are reduced as much as possible.

The method in the embodiments of the present invention is described above in detail, and an apparatus in an embodiment of the present invention is provided below.

Figure 6:
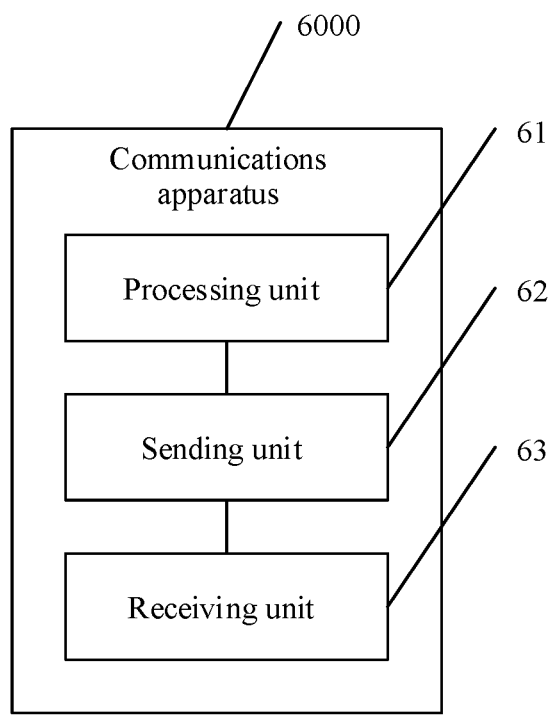
FIG. 6 is a schematic modular diagram of a communications apparatus according to an embodiment of the present invention.

An embodiment of the present invention further provides a communications apparatus. The communications apparatus may be applied to the foregoing communication method. FIG. 6 is a schematic modular diagram of a communications apparatus according to an embodiment of the present invention. The communications apparatus 6000 includes a processing unit 61 and a sending unit 62. The processing unit 61 is configured to determine a configuration mode of one or more pilots used for K repeated transmissions, where the configuration mode includes at least one of the following modes: a first configuration mode, a second configuration mode, or a third configuration mode; and in the first configuration mode, the communications apparatus sends a same pilot in each of first N of the K repeated transmissions, and does not send a pilot in remaining K−N transmissions; in the second configuration mode, the communications apparatus sends a first pilot in each of first N of the K repeated transmissions, and sends a second pilot in each of remaining K−N transmissions; in the third configuration mode, the communications apparatus sends the first pilot in each transmission in a first round of K repeated transmissions, and sends the second pilot in each transmission in a second round of K repeated transmissions, where the first round of K repeated transmissions is adjacent to the second round of K repeated transmissions, a pilot pattern of the second pilot is the same as a pilot pattern of the first pilot, a pilot sequence of the second pilot is obtained after minus one is multiplied by a pilot sequence generated by the first pilot in a subframe in which the first pilot is located, K≥2, and N is a positive integer less than K. The sending unit 62 is configured to send the pilots based on the determined configuration mode when the K repeated transmissions are performed. The communications apparatus may be specifically the terminal device in the foregoing embodiments.

In one embodiment, the communications apparatus 6000 may further include a receiving unit 63. The receiving unit 63 is configured to receive configuration information sent by a network device, where the configuration information is used to determine the configuration mode of the pilots used for the K repeated transmissions.

In one embodiment, the receiving unit 63 is further configured to receive a configuration switch indication of the pilots; and the processing unit 61 is further configured to switch a current configuration mode of the pilots to a previously configured dual-pilot configuration mode according to the configuration switch indication, where in the dual-pilot configuration mode, a third pilot is sent in the first of the K repeated transmissions, and a fourth pilot is sent in one or more other of the K repeated transmissions, where a pilot sequence of the fourth pilot cannot be expressed as a product of a constant and a pilot sequence of the third pilot in a subframe in which the fourth pilot is located, or a pilot pattern of the third pilot is different from a pilot pattern of the fourth pilot.

In one embodiment, the configuration information further includes information used to determine a pilot pattern and a pilot sequence.

Figure 7:
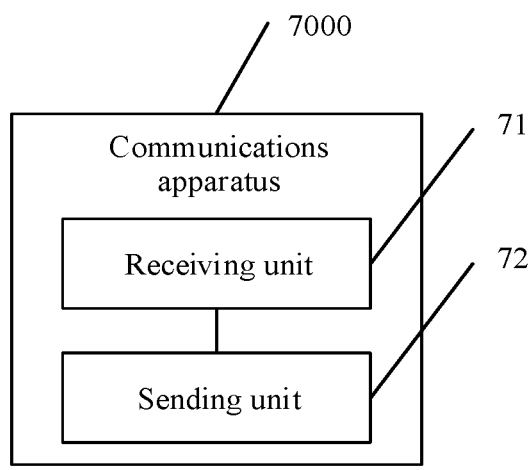
FIG. 7 is a schematic modular diagram of another communications apparatus according to an embodiment of the present invention.

FIG. 7 is a schematic modular diagram of another communications apparatus according to an embodiment of the present invention. The communications apparatus 7000 includes a receiving unit 71 and a sending unit 72. The receiving unit 71 is configured to receive configuration information that is of a pilot used for physical layer data demodulation and that is sent by a network device, where the configuration information of the pilot is configuration information of a first type or configuration information of a second type, where the configuration information of the first type includes information used to determine a pilot pattern and a pilot sequence, a sending period of the pilot, and information used to determine a sending location of the pilot in the sending period; and the configuration information of the second type includes spreading code information and information used to determine a pilot pattern and a pilot sequence, and the spreading code information is used to determine pilots sent in a plurality of subframes. The sending unit 72 is configured to send the pilot based on the configuration information of the pilot. The communications apparatus may be specifically the terminal device in the foregoing embodiments.

In one embodiment, the information used to determine the sending location of the pilot in the sending period includes an offset location of the pilot in the sending period.

In one embodiment, the sending period of the pilot is specifically N subframes, where N>1.

In one embodiment, the information used to determine the pilot pattern and the pilot sequence includes: a pilot pattern index and a pilot sequence generation parameter index, or a pilot port index, where each pilot port index corresponds to a combination of a pilot pattern and a pilot sequence generation parameter.

The communications apparatuses shown in FIG. 6 and FIG. 7 may be specific terminal devices, or all or some functions of the communications apparatus may be implemented by using a system-on-a-chip (SoC) technology, for example, implemented by using one chip. Specifically, in one embodiment, FIG. 8 is a simplified schematic structural diagram of a terminal device.

Figure 8:
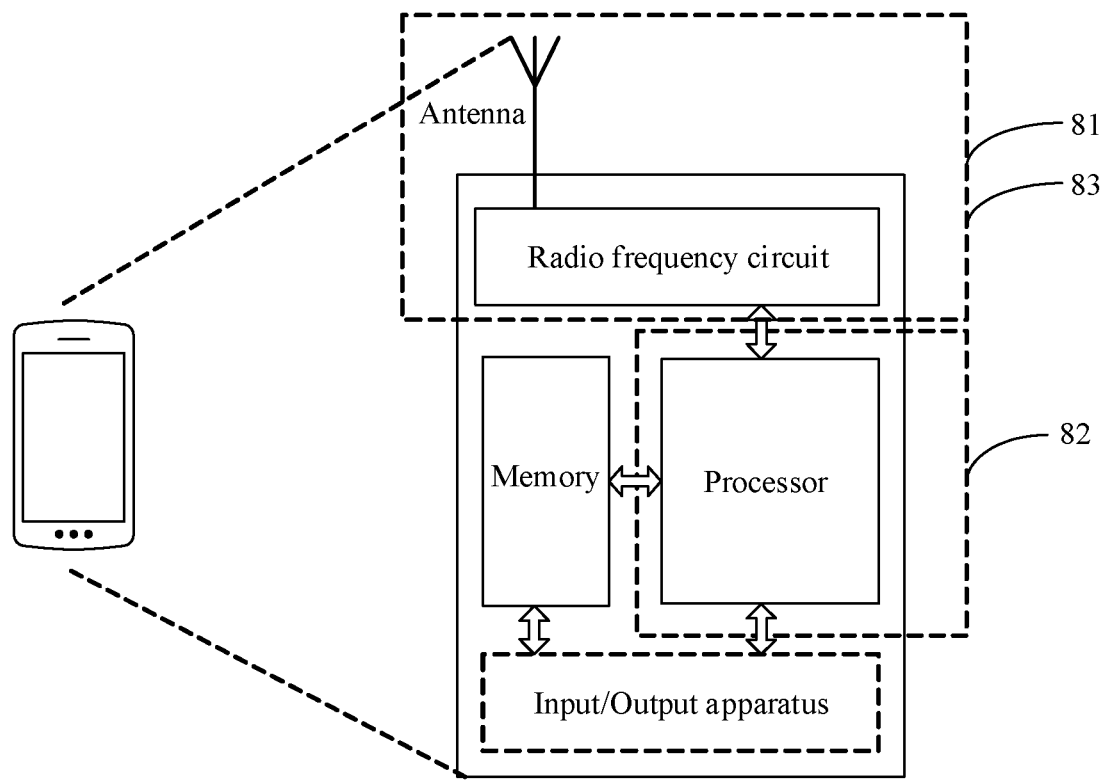
FIG. 8 is a simplified schematic structural diagram of an example of a terminal device according to an embodiment of the present invention.

For ease of understanding and convenience of figure illustration, an example in which the terminal device is a mobile phone is used in FIG. 8. As shown in FIG. 8, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is mainly configured to store the software program and the data. The radio frequency circuit is mainly configured to perform conversion between a baseband signal and a radio frequency signal, and process the radio frequency signal. The antenna is mainly configured to receive and send a radio frequency signal in a form of an electromagnetic wave. The input/ output apparatus, such as a touchscreen, a display, or a keyboard, is mainly configured to: receive data input by a user and output data to the user. It should be noted that some types of terminal devices may have no input/output apparatus.

When needing to send data, after performing baseband processing on to-be-sent data, the processor outputs a baseband signal to the radio frequency circuit; and the radio frequency circuit performs radio frequency processing on the baseband signal and then sends the radio frequency signal to outside in a form of an electromagnetic wave by using the antenna. When data is sent to the terminal device, the radio frequency circuit receives a radio frequency signal by using the antenna, converts the radio frequency signal into a baseband signal, and outputs the baseband signal to the processor. The processor converts the baseband signal into data, and processes the data. For ease of description, FIG. 8 shows only one memory and only one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have receiving and sending functions may be considered as a receiving unit and a sending unit (which may also be collectively referred to as a transceiver unit) of the terminal device, and the processor having a processing function may be considered as a processing unit of the terminal device. As shown in FIG. 8, the terminal device includes a receiving unit 81, a processing unit 82, and a sending unit 83. The receiving unit 81 may also be referred to as a receiver, a receiving device, a receiving circuit, or the like. The sending unit 83 may also be referred to as a sender, a transmitter, a transmitting device, a transmitting circuit, or the like. The processing unit 82 may also be referred to as a processor, a processing board, a processing module, a processing apparatus, or the like.

For example, in an embodiment, the processing unit 82 is configured to perform operation S201 in the embodiment shown in FIG. 2, and the sending unit 83 is configured to perform operation S202 in the embodiment shown in FIG. 2.

In another embodiment, the receiving unit 81 is configured to perform operation S402 in the embodiment shown in FIG. 4, and the sending unit 83 is configured to perform operation S403 in the embodiment shown in FIG. 4.

In one embodiment, all or some functions of the communications apparatus may be implemented by using an SoC technology, for example, implemented by using one chip. The chip integrates a kernel, an input/output interface, and the like. The input/output interface may implement functions of the foregoing sending unit and receiving unit, for example, send one or more pilots based on a determined configuration mode, or receive configuration information that is of a pilot used for physical layer data demodulation and that is sent by a network device, and send the pilot based on the configuration information of the pilot. The kernel may implement a function of the foregoing processing unit, for example, determine the configuration mode of the pilots used for K repeated transmissions. The functions of the kernel and the input/output interface may be implemented by hardware, or may be implemented by hardware executing corresponding software. The hardware or the software includes one or more modules corresponding to the foregoing functions. In another embodiment, an input/output port may alternatively be a port through which the chip is connected to a circuit, a component, or a device outside the chip, and is configured to: output, to the circuit, the component, or the device connected to the chip, a pilot generated by the chip, or receive configuration information provided by the circuit, the component, or the device connected to the terminal. Alternatively, the input/output port may be a port through which the chip is connected to a circuit, a component, or a device outside the chip, and is configured to: output configuration information of pilots that is generated by the chip to the circuit, the component, or the device connected to the chip, or receive a pilot provided by the circuit, the component, or the device connected to the chip.

Figure 9:
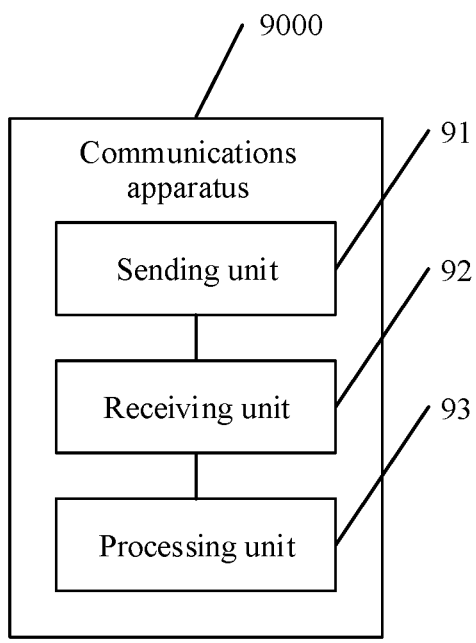
FIG. 9 is a schematic modular diagram of still another communications apparatus according to an embodiment of the present invention.

An embodiment of the present invention further provides another communications apparatus. The communications apparatus may be applied to the foregoing communication method. FIG. 9 is a schematic modular diagram of another communications apparatus according to an embodiment of the present invention. The communications apparatus 9000 includes a sending unit 91 and a receiving unit 92. The sending unit 91 is configured to send configuration information to a terminal device, where the configuration information is used to determine a configuration mode of one or more pilots used for K repeated transmissions of the terminal device, the configuration mode includes at least one of the following modes: a first configuration mode, a second configuration mode, or a third configuration mode; and in the first configuration mode, the terminal device sends a same pilot in each of first N of the K repeated transmissions, and does not send a pilot in remaining K−N transmissions; in the second configuration mode, the terminal device sends a first pilot in each of first N of the K repeated transmissions, and sends a second pilot in each of remaining K−N transmissions; in the third configuration mode, the terminal device sends the first pilot in each transmission in a first round of K repeated transmissions, and sends the second pilot in each transmission in a second round of K repeated transmissions, where the first round of K repeated transmissions is adjacent to the second round of K repeated transmissions, a pilot pattern of the second pilot is the same as a pilot pattern of the first pilot, a pilot sequence of the second pilot is obtained after minus one is multiplied by a pilot sequence generated by the first pilot in a subframe in which the first pilot is located, K≥2, and N is a positive integer less than K. The receiving unit 92 is configured to receive the pilots sent by the terminal device based on the configuration mode determined based on the configuration information.

In one embodiment, the communications apparatus 9000 further includes a processing unit 93. The processing unit 93 is configured to determine, based on an abrupt energy change or phase change of the received pilots, a subframe in which the first of the K repeated transmissions of the terminal device is performed.

In one embodiment, the sending unit 91 is further configured to send a configuration switch indication of the pilots to the terminal device, where the configuration switch indication is used to instruct the terminal device to switch a current configuration mode of the pilots to a previously configured dual-pilot configuration mode, and in the dual-pilot configuration mode, a third pilot is sent in the first of the K repeated transmissions, and a fourth pilot is sent in one or more other of the K repeated transmissions, where a pilot sequence of the fourth pilot cannot be expressed as a product of a constant and a pilot sequence of the third pilot in a subframe in which the fourth pilot is located, or a pilot pattern of the third pilot is different from a pilot pattern of the fourth pilot.

Figure 10:
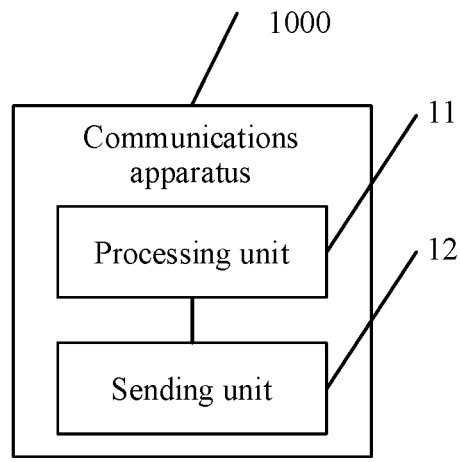
FIG. 10 is a schematic modular diagram of yet another communications apparatus according to an embodiment of the present invention.

In one embodiment, the configuration information further includes information used to determine a pilot pattern and a pilot sequence. FIG. 10 is a schematic modular diagram of yet another communications apparatus according to an embodiment of the present invention. The communications apparatus 1000 includes a processing unit 11 and a sending unit 12. The processing unit 11 is configured to allocate a pilot used for physical layer data demodulation to a terminal device; and the sending unit 12 is configured to send configuration information of the pilot to the terminal device, where the configuration information of the pilot is configuration information of a first type or configuration information of a second type, where the configuration information of the first type includes information used to determine a pilot pattern and a pilot sequence, a sending period of the pilot, and information used to determine a sending location of the pilot in the sending period; and the configuration information of the second type includes spreading code information and information used to determine a pilot pattern and a pilot sequence, and the spreading code information is used to determine pilots sent in a plurality of subframes. The communications apparatus may be specifically the network device in the foregoing embodiments.

In one embodiment, the information used to determine the sending location of the pilot in the sending period includes an offset location of the pilot in the sending period.

In one embodiment, the sending period of the pilot is specifically N subframes, where N>1.

In one embodiment, the information used to determine the pilot pattern and the pilot sequence includes: a pilot pattern index and a pilot sequence generation parameter index, or a pilot port index, where each pilot port index corresponds to a combination of a pilot pattern and a pilot sequence generation parameter.

Figure 11:
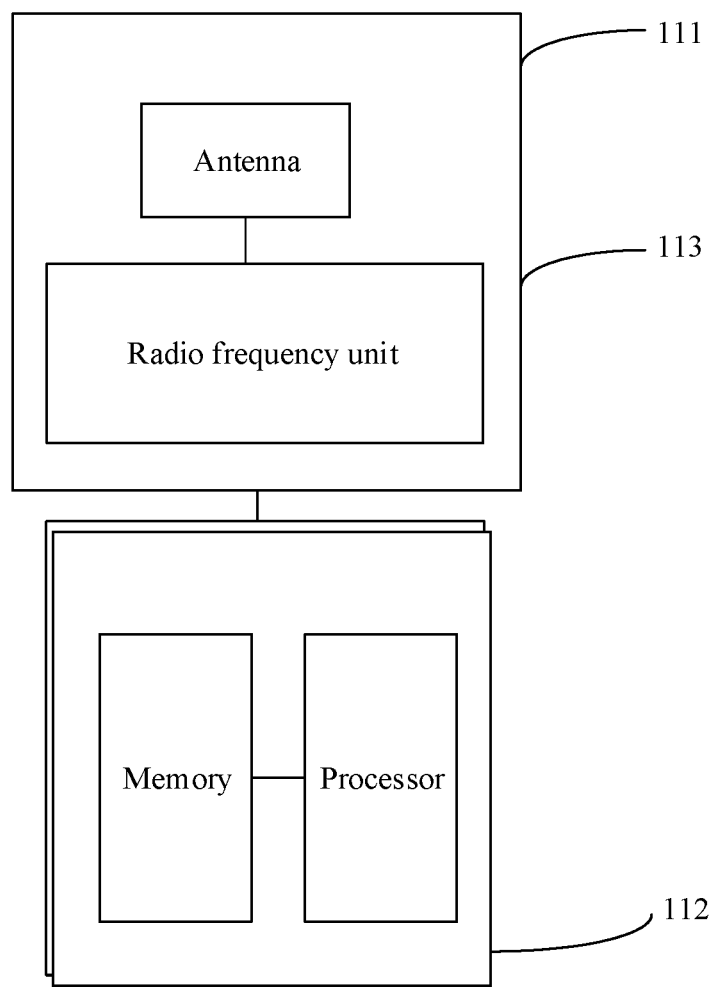
FIG. 11 is a simplified schematic structural diagram of an example of a network device according to an embodiment of the present invention.

The communications apparatuses shown in FIG. 9 and FIG. 10 may be specific network devices, or all or some functions of the communications apparatus may be implemented by using an SoC technology. Specifically, in one embodiment, FIG. 11 is a simplified schematic structural diagram of a network device.

The network device includes a part 112 and a part for radio frequency signal receiving/sending and conversion. The part for radio frequency signal receiving and sending and conversion further includes a receiving unit part 111 and a sending unit part 113 (which may also be collectively referred to as a transceiver unit). The part for radio frequency signal receiving/sending and conversion is mainly configured to: send/receive a radio frequency signal and perform conversion between a radio frequency signal and a baseband signal. The part 112 is mainly configured to perform baseband processing, control the network device, and the like. The receiving unit 111 may also be referred to as a receiver, a receiving device, a receiving circuit, or the like. The sending unit 113 may also be referred to as a sender, a transmitter, a transmitting device, a transmitting circuit, or the like. The part 112 is usually a control center of the network device, and is usually referred to as a processing unit. For details, refer to the foregoing descriptions of the related parts.

The part 112 may include one or more boards. Each board may include one or more processors and one or more memories. The processor is configured to read and execute a program in the memory to implement a baseband processing function and control the network device. If there are a plurality of boards, the boards may be interconnected to enhance a processing capability. In an optional implementation, alternatively, the plurality of boards may share one or more processors, or the plurality of boards share one or more memories, or the plurality of boards simultaneously share one or more processors.

For example, in an embodiment, the receiving unit 111 is configured to perform operation S202 in FIG. 2.

In another embodiment, the receiving unit 111 is configured to perform operation S402 in the embodiment shown in FIG. 4, and the sending unit 113 is configured to perform operation S403 in the embodiment shown in FIG. 4.

In one embodiment, all or some functions of the communications apparatus may be implemented by using an SoC technology, for example, implemented by using one chip. The chip integrates a kernel, an input/output interface, and the like. The input/output interface may implement functions of the foregoing sending unit and receiving unit, for example, send configuration information to a terminal device, and receive pilots sent by the terminal device in a configuration mode determined based on the configuration information; or send the configuration information of the pilots to the terminal device. The kernel may implement a processing function, for example, determine, based on an abrupt energy change or phase change of received pilots, a subframe in which the first of K repeated transmissions of the terminal device is performed, or send the configuration information of the pilots to the terminal device. The functions of the kernel and the input/output interface may be implemented by hardware, or may be implemented by hardware executing corresponding software. The hardware or the software includes one or more modules corresponding to the foregoing functions. In another embodiment, an input/output port may alternatively be a port through which the chip is connected to a circuit, a component, or a device outside the chip, and is configured to: output, to the circuit, the component, or the device connected to the chip, configuration information generated by the chip, or receive a pilot provided by the circuit, the component, or the device connected to the terminal. Alternatively, the input/output port may be a port through which the chip is connected to a circuit, a component, or a device outside the chip, and is configured to: output configuration information of pilots that is generated by the chip to the circuit, the component, or the device connected to the chip, or receive a signal provided by the circuit, the component, or the device connected to the chip.

A person of ordinary skill in the art may be aware that, in combination with the units and algorithm operations in the examples described in the embodiments disclosed in this specification, this application may be implemented by electronic hardware or a combination of electronic hardware and computer software. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, division into the modules or units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

All or some of the foregoing embodiments may be implemented by using software, hardware, firmware, or any combination thereof. When software is used to implement the embodiments, some or all of the embodiments may be implemented in a form of a computer program product. The computer program product includes one or more computer instructions. When the computer program instructions are loaded and executed on a computer, some or all of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

A person of ordinary skill in the art may understand that all or some of the processes of the methods in the embodiments may be implemented by a computer program instructing relevant hardware. The program may be stored in a computer-readable storage medium. When the program is executed, the processes of the methods in the embodiments are performed. The foregoing storage medium includes: any medium that can store program code, such as a read-only memory (ROM), a random access memory (RAM), a magnetic disk, or an optical disc.

What is claimed is:

1. A communication method, comprising:
    determining, by a terminal device, a configuration mode of one or more pilots used for K repeated transmissions, wherein the configuration mode comprises at least one of the following modes: a first configuration mode, a second configuration mode, or a third configuration mode; and wherein in the first configuration mode, the terminal device sends a same pilot in each of first N of the K repeated transmissions, and does not send a pilot in remaining K−N transmissions; wherein in the second configuration mode, the terminal device sends a first pilot in each of first N of the K repeated transmissions, and sends a second pilot in each of remaining K−N transmissions; wherein in the third configuration mode, the terminal device sends the first pilot in each transmission in a first round of the K repeated transmissions, and sends the second pilot in each transmission in a second round of the K repeated transmissions, wherein the first round of the K repeated transmissions is adjacent to the second round of the K repeated transmissions, wherein a pilot pattern of the second pilot is the same as a pilot pattern of the first pilot, wherein a pilot sequence of the second pilot is obtained after minus one is multiplied by a pilot sequence generated by the first pilot in a subframe in which the first pilot is located, wherein K≥2, and N is a positive integer less than K; and
    sending, by the terminal device, the one or more pilots based on the determined configuration mode when performing the K repeated transmissions.

2. The method according to claim 1, wherein the determining, by the terminal device, the configuration mode of the one or more pilots used for the K repeated transmissions comprises:
    receiving, by the terminal device, configuration information sent by a network device, wherein the configuration information is used to determine the configuration mode of the pilots used for the K repeated transmissions.

3. The method according to claim 1, wherein the method further comprises:
    receiving, by the terminal device, a configuration switch indication of the one or more pilots; and
    switching, by the terminal device, a current configuration mode of the one or more pilots to a previously configured dual-pilot configuration mode according to the configuration switch indication, wherein in the dual-pilot configuration mode, a third pilot is sent in the first of the K repeated transmissions, and wherein a fourth pilot is sent in one or more other of the K repeated transmissions, wherein a pilot sequence of the fourth pilot cannot be expressed as a product of a constant and a pilot sequence of the third pilot in a subframe in which the fourth pilot is located, or a pilot pattern of the third pilot is different from a pilot pattern of the fourth pilot.

4. A communication method, comprising:
    sending, by a network device, configuration information to a terminal device, wherein the configuration information is used to determine a configuration mode of one or more pilots used for K repeated transmissions of the terminal device, wherein the configuration mode comprises at least one of the following modes: a first configuration mode, a second configuration mode, or a third configuration mode; and wherein in the first configuration mode, the terminal device sends a same pilot in each of first N of the K repeated transmissions, and does not send a pilot in remaining K−N transmissions; wherein in the second configuration mode, the terminal device sends a first pilot in each of first N of the K repeated transmissions, and sends a second pilot in each of remaining K−N transmissions; wherein in the third configuration mode, the terminal device sends the first pilot in each transmission in a first round of the K repeated transmissions, and sends the second pilot in each transmission in a second round of the K repeated transmissions, wherein the first round of K repeated transmissions is adjacent to the second round of the K repeated transmissions, wherein a pilot pattern of the second pilot is the same as a pilot pattern of the first pilot, wherein a pilot sequence of the second pilot is obtained after minus one is multiplied by a pilot sequence generated by the first pilot in a subframe in which the first pilot is located, wherein K≥2, and N is a positive integer less than K; and receiving, by the network device, the one or more pilots sent by the terminal device based on the configuration mode determined based on the configuration information.

5. The method according to claim 4, wherein the method further comprises:

determining, by the network device based on an abrupt energy change or phase change of the received one or more pilots, a subframe in which the first of the K repeated transmissions of the terminal device is performed.

6. The method according to claim 4, wherein the method further comprises:

sending, by the network device, a configuration switch indication of the one or more pilots to the terminal device, wherein the configuration switch indication is used to instruct the terminal device to switch a current configuration mode of the one or more pilots to a previously configured dual-pilot configuration mode, and wherein in the dual-pilot configuration mode, a third pilot is sent in the first of the K repeated transmissions, and wherein a fourth pilot is sent in one or more other of the K repeated transmissions, wherein a pilot sequence of the fourth pilot cannot be expressed as a product of a constant and a pilot sequence of the third pilot in a subframe in which the fourth pilot is located, or a pilot pattern of the third pilot is different from a pilot pattern of the fourth pilot.

7. The method according to claim 4, wherein the configuration information further comprises information used to determine a pilot pattern and a pilot sequence.

8. A communications apparatus, comprising:

a processing unit, configured to determine a configuration mode of one or more pilots used for K repeated transmissions, wherein the configuration mode comprises at least one of the following modes: a first configuration mode, a second configuration mode, or a third configuration mode; and wherein in the first configuration mode, the communications apparatus sends a same pilot in each of first N of the K repeated transmissions, and does not send a pilot in remaining K−N transmissions; wherein in the second configuration mode, the communications apparatus sends a first pilot in each of first N of the K repeated transmissions, and sends a second pilot in each of remaining K−N transmissions; wherein in the third configuration mode, the communications apparatus sends the first pilot in each transmission in a first round of the K repeated transmissions, and sends the second pilot in each transmission in a second round of the K repeated transmissions, wherein the first round of the K repeated transmissions is adjacent to the second round of the K repeated transmissions, wherein a pilot pattern of the second pilot is the same as a pilot pattern of the first pilot, wherein a pilot sequence of the second pilot is obtained after minus one is multiplied by a pilot sequence generated by the first pilot in a subframe in which the first pilot is located, wherein K≥2, and N is a positive integer less than K; and a sending unit, configured to send the one or more pilots based on the determined configuration mode when the K repeated transmissions are performed.

9. The communications apparatus according to claim 8, further comprising:

a receiving unit, configured to receive configuration information sent by a network device, wherein the configuration information is used to determine the configuration mode of the one or more pilots used for the K repeated transmissions.

10. The communications apparatus according to claim 9, wherein the receiving unit is further configured to receive a configuration switch indication of the one or more pilots; and the processing unit is further configured to switch a current configuration mode of the one or more pilots to a previously configured dual-pilot configuration mode according to the configuration switch indication, wherein in the dual-pilot configuration mode, a third pilot is sent in the first of the K repeated transmissions, and wherein a fourth pilot is sent in one or more other of the K repeated transmissions, wherein a pilot sequence of the fourth pilot cannot be expressed as a product of a constant and a pilot sequence of the third pilot in a subframe in which the fourth pilot is located, or a pilot pattern of the third pilot is different from a pilot pattern of the fourth pilot.

11. A communications apparatus, comprising:

a sending unit, configured to send configuration information to a terminal device, wherein the configuration information is used to determine a configuration mode of one or more pilots used for K repeated transmissions of the terminal device, wherein the configuration mode comprises at least one of the following modes: a first configuration mode, a second configuration mode, or a third configuration mode; and wherein in the first configuration mode, the terminal device sends a same pilot in each of first N of the K repeated transmissions, and does not send a pilot in remaining K−N transmissions; wherein in the second configuration mode, the terminal device sends a first pilot in each of first N of the K repeated transmissions, and sends a second pilot in each of remaining K−N transmissions; wherein in the third configuration mode, the terminal device sends the first pilot in each transmission in a first round of the K repeated transmissions, and sends the second pilot in each transmission in a second round of the K repeated transmissions, wherein the first round of K transmissions is adjacent to the second round of K transmissions, wherein a pilot pattern of the second pilot is the same as a pilot pattern of the first pilot, wherein a pilot sequence of the second pilot is obtained after minus one is multiplied by a pilot sequence generated by the first pilot in a subframe in which the first pilot is located, wherein K≥2, and N is a positive integer less than K; and a receiving unit, configured to receive the one or more pilots sent by the terminal device based on the configuration mode determined based on the configuration information.

12. The communications apparatus according to claim 11, further comprising:

a processing unit, configured to determine, based on an abrupt energy change or phase change of the received wherein pilots, a subframe in which the first of the K repeated transmissions of the terminal device is performed.

13. The communications apparatus according to claim 11, wherein the sending unit is further configured to send a configuration switch indication of the pilots to the terminal device, wherein the configuration switch indication is used to instruct the terminal device to switch a current configuration mode of the one or more pilots to a previously configured dual-pilot configuration mode, and wherein in the dual-pilot configuration mode, a third pilot is sent in the first of the K repeated transmissions, and wherein a fourth pilot is sent in one or more other of the K repeated transmissions, wherein a pilot sequence of the fourth pilot cannot be expressed as a product of a constant and a pilot sequence of the third pilot in a subframe in which the fourth pilot is located, or a pilot pattern of the third pilot is different from a pilot pattern of the fourth pilot.

14. The communications apparatus according to claim 11, wherein the configuration information further comprises information used to determine a pilot pattern and a pilot sequence.

* * * * *